United States Patent
Ka et al.

(10) Patent No.: US 9,454,301 B2
(45) Date of Patent: Sep. 27, 2016

(54) MOBILE TERMINAL CONTROLLED BY AT LEAST ONE TOUCH AND METHOD OF CONTROLLING THEREFOR

(71) Applicant: LG ELECTRONICS INC., Seoul (KR)

(72) Inventors: Hokyung Ka, Seoul (KR); Jaedong Kim, Seoul (KR); Kyoungho Lee, Seoul (KR); Jinho Cho, Seoul (KR); Woong Jeong, Seoul (KR); Chul Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/590,687

(22) Filed: Jan. 6, 2015

(65) Prior Publication Data
US 2016/0036966 A1 Feb. 4, 2016

(30) Foreign Application Priority Data
Aug. 1, 2014 (KR) .................. 10-2014-0099012

(51) Int. Cl.
*G06F 3/0488* (2013.01)
*G06F 3/0481* (2013.01)
*G06F 3/0484* (2013.01)

(52) U.S. Cl.
CPC ......... *G06F 3/0488* (2013.01); *G06F 3/04817* (2013.01); *G06F 3/04842* (2013.01)

(58) Field of Classification Search
CPC ............... H04N 5/23293; H04N 5/23216; H04N 5/23212; H04N 5/232; H04N 5/23229; H04N 5/23296; H04N 1/0432; H04N 1/2392; H04N 5/772; H04N 5/23245; H04W 4/02
See application file for complete search history.

(56) References Cited

U.S. PATENT DOCUMENTS

| | | | |
|---|---|---|---|
| 6,331,840 B1 | 12/2001 | Nielson et al. | |
| 2010/0020221 A1* | 1/2010 | Tupman | G06F 3/04883 348/333.01 |
| 2011/0209100 A1 | 8/2011 | Hinckley et al. | |
| 2013/0076963 A1 | 3/2013 | Sirpal et al. | |
| 2014/0184471 A1 | 7/2014 | Martynov et al. | |

FOREIGN PATENT DOCUMENTS

| | | |
|---|---|---|
| KR | 10-2010-0132866 | 12/2010 |
| KR | 10-1341737 | 12/2013 |
| KR | 10-2014-0066236 | 5/2014 |

OTHER PUBLICATIONS

PCT International Application No. PCT/KR2014/012898, Written Opinion of the International Searching Authority dated Apr. 2, 2015, 16 pages.

* cited by examiner

*Primary Examiner* — Kabir A Timory
(74) *Attorney, Agent, or Firm* — Lee, Hong, Degerman, Kang & Waimey; Jonathan Kang; Harry Lee

(57) ABSTRACT

A mobile terminal is disclosed. A mobile terminal according to one embodiment of the present invention includes a memory configured to store at least one command in advance, a display module configured to output a screen containing at least one selected from the group consisting of a text data, an image data and a video data, a first user interface module configured to detect a first touch of a user, a controller configured to execute a first command on the basis of the detected first touch and a second user interface module configured to detect a second touch of the user, wherein the controller is configured to control a second command to be executed on the basis of the detected second touch.

20 Claims, 51 Drawing Sheets

FIG. 9

| mode / First touch | | Internet mode |
|---|---|---|
| Number of touch | 1 | enlarge |
| | 2 | reduce |
| Position of touch | 1 | display |
| | 2 | Transmit to external device |
| | 3 | Switch to editing mode |

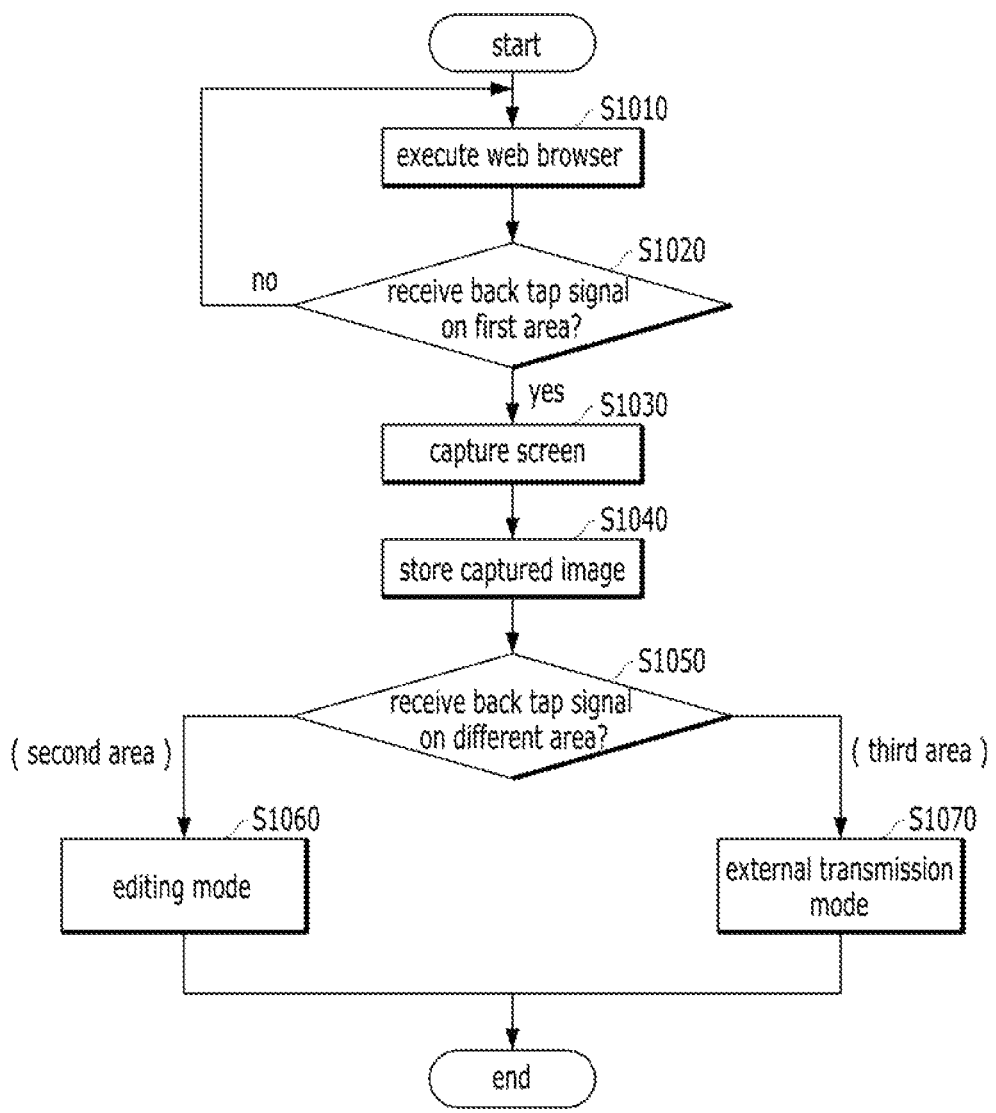

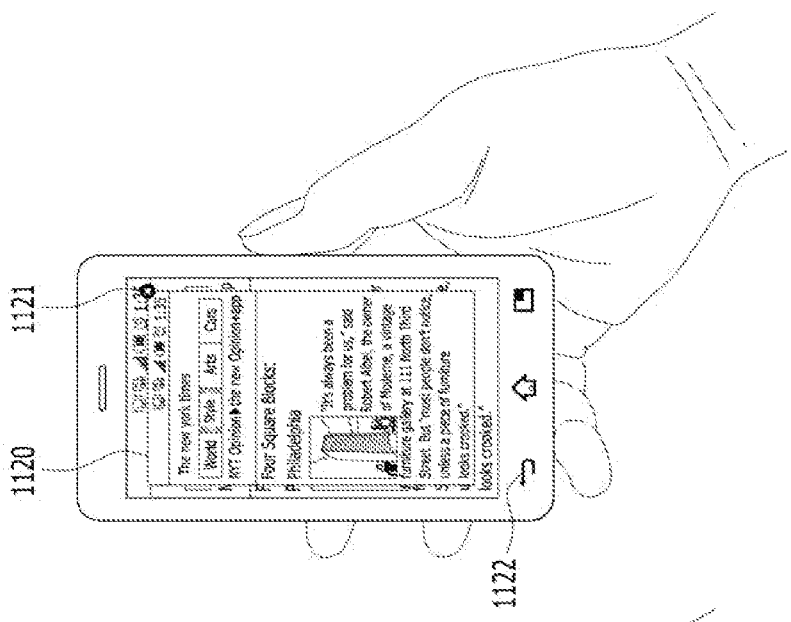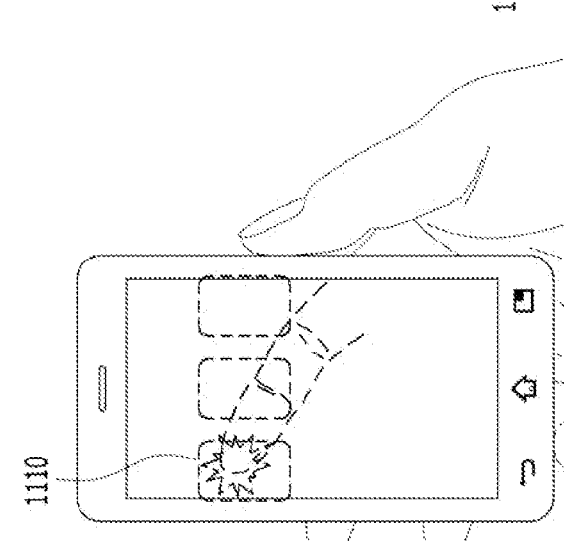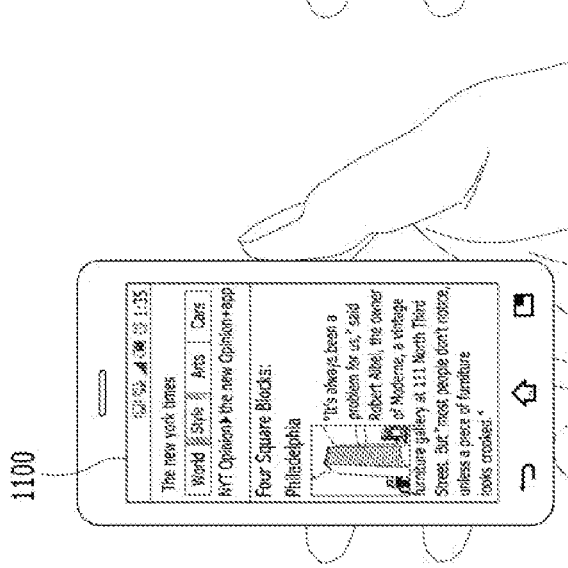

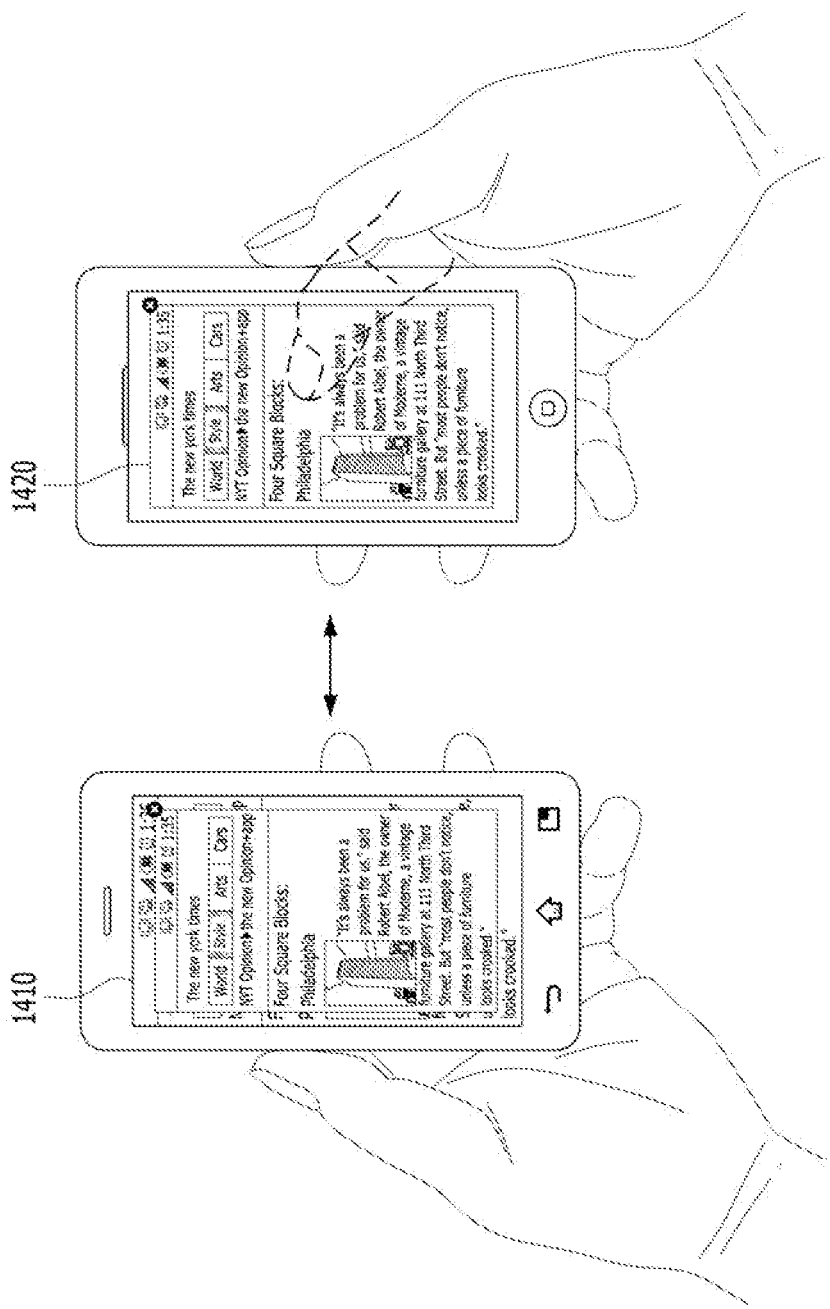

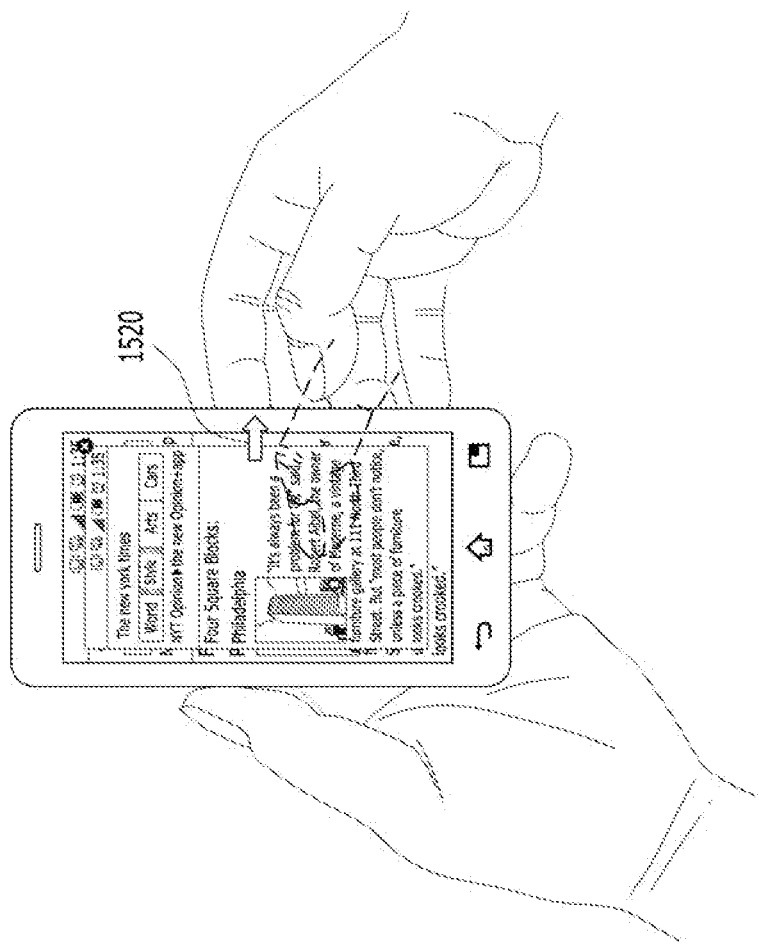
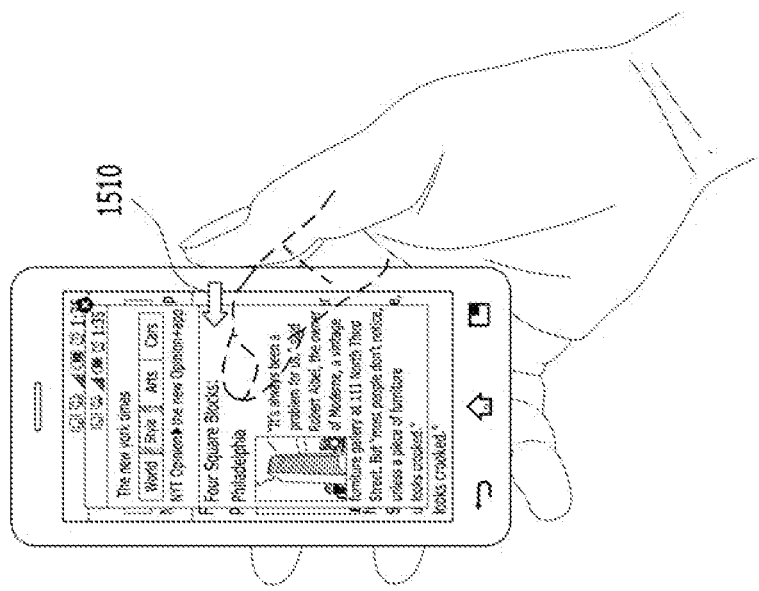

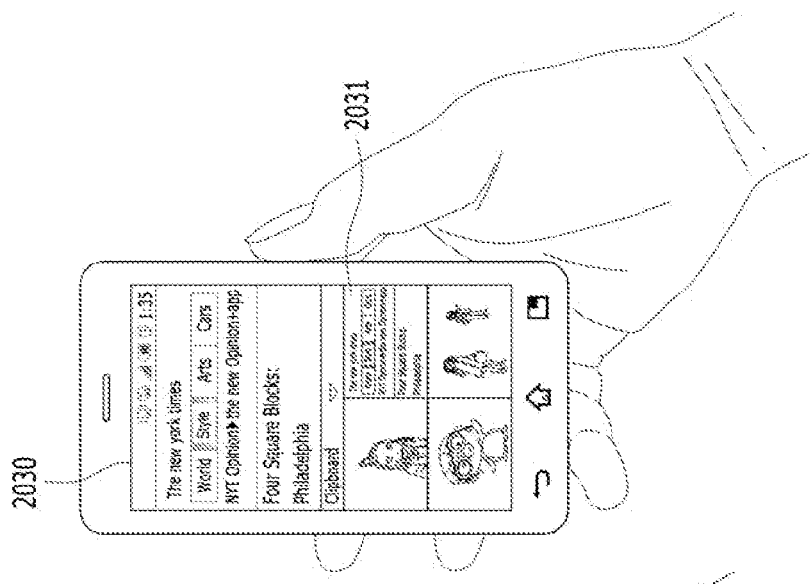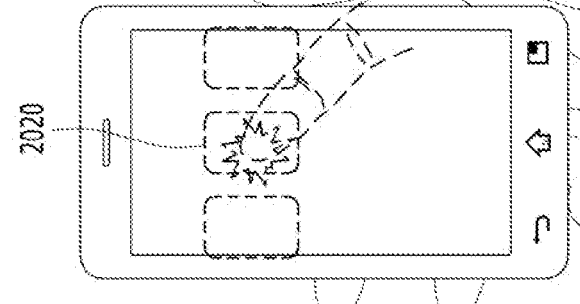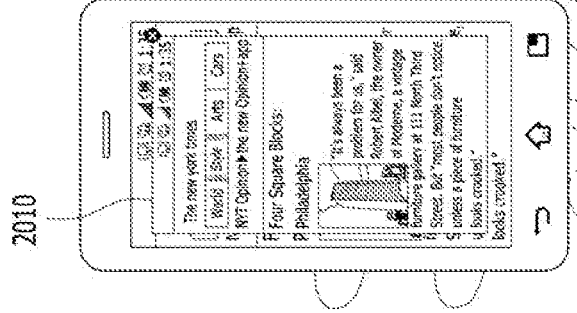

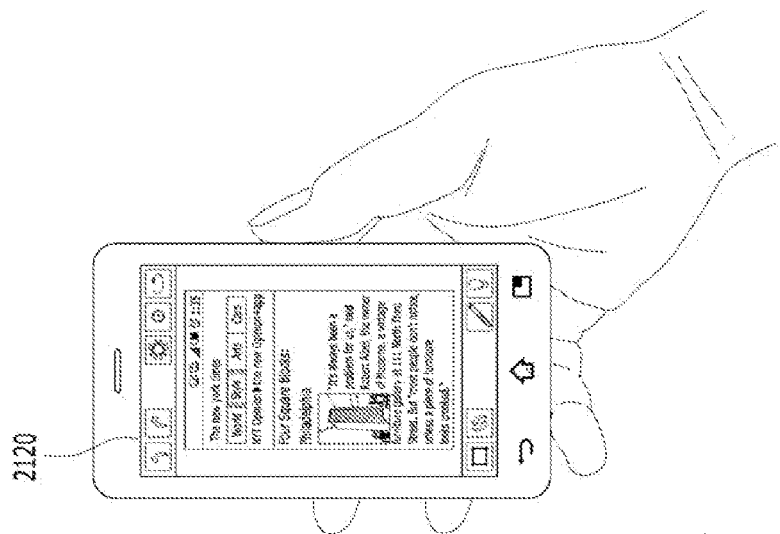
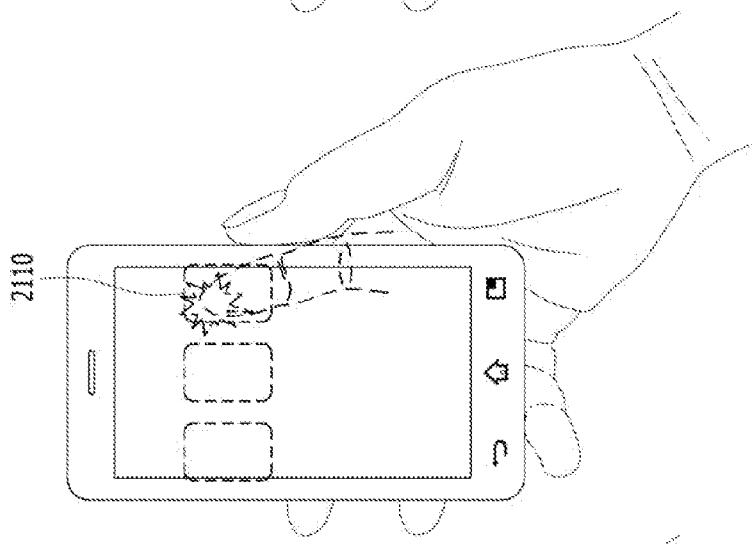
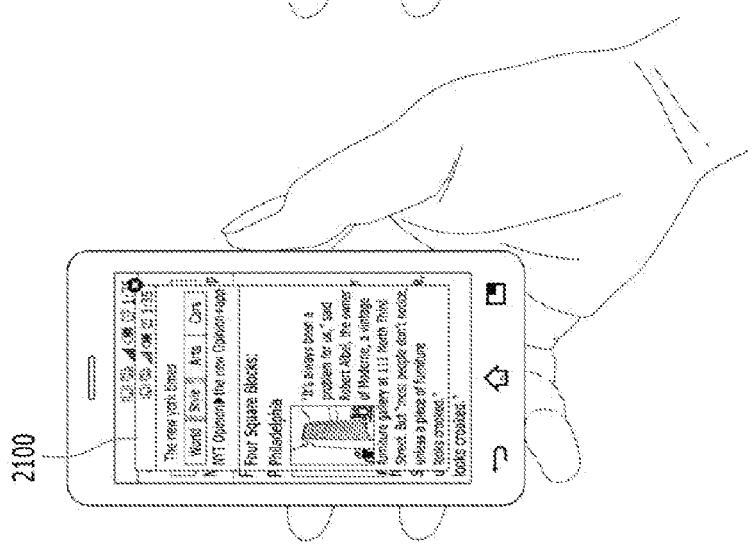

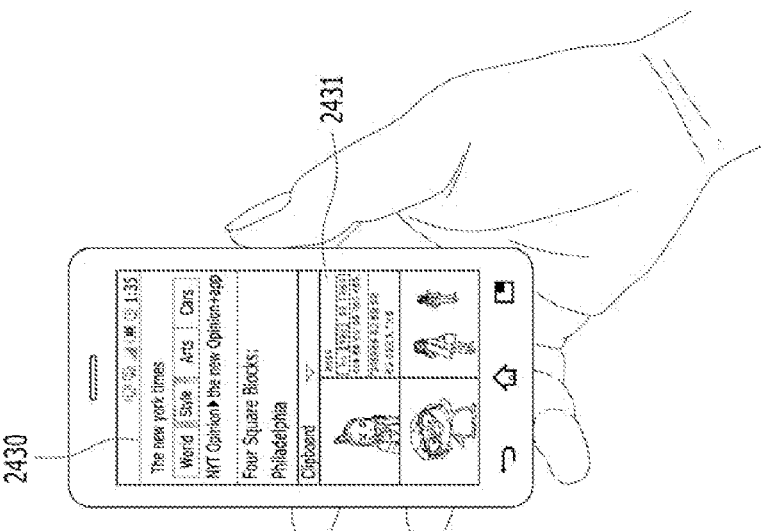
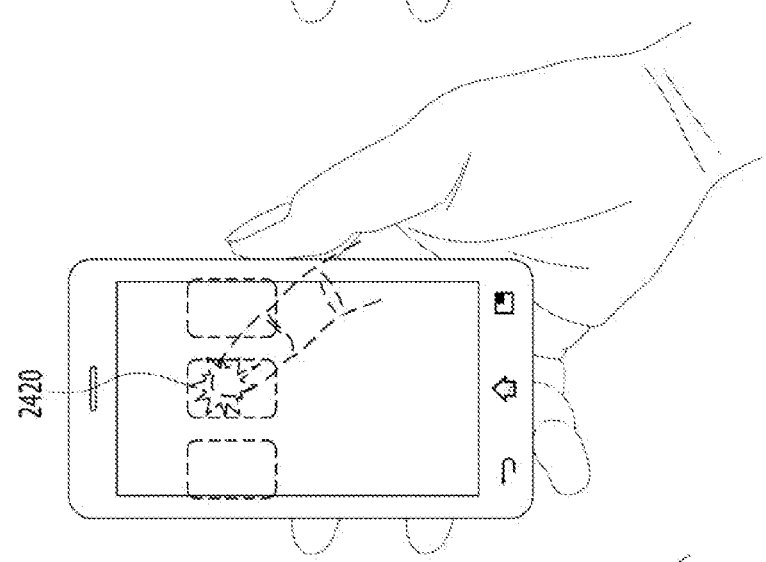
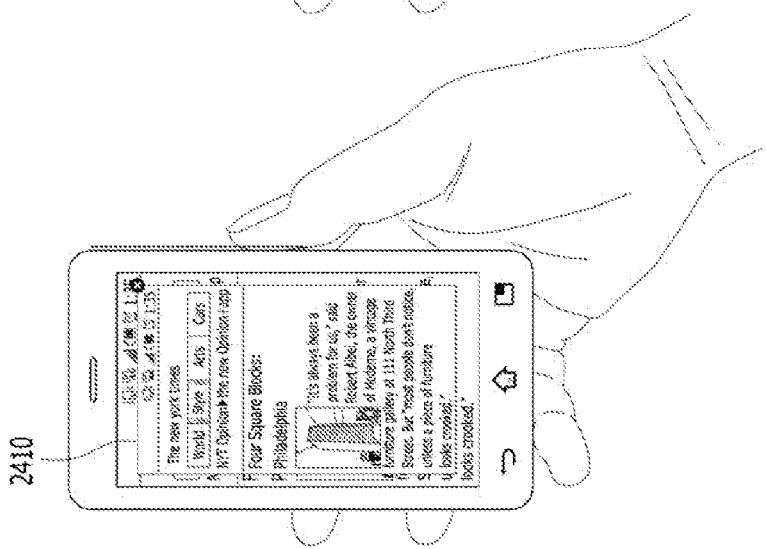

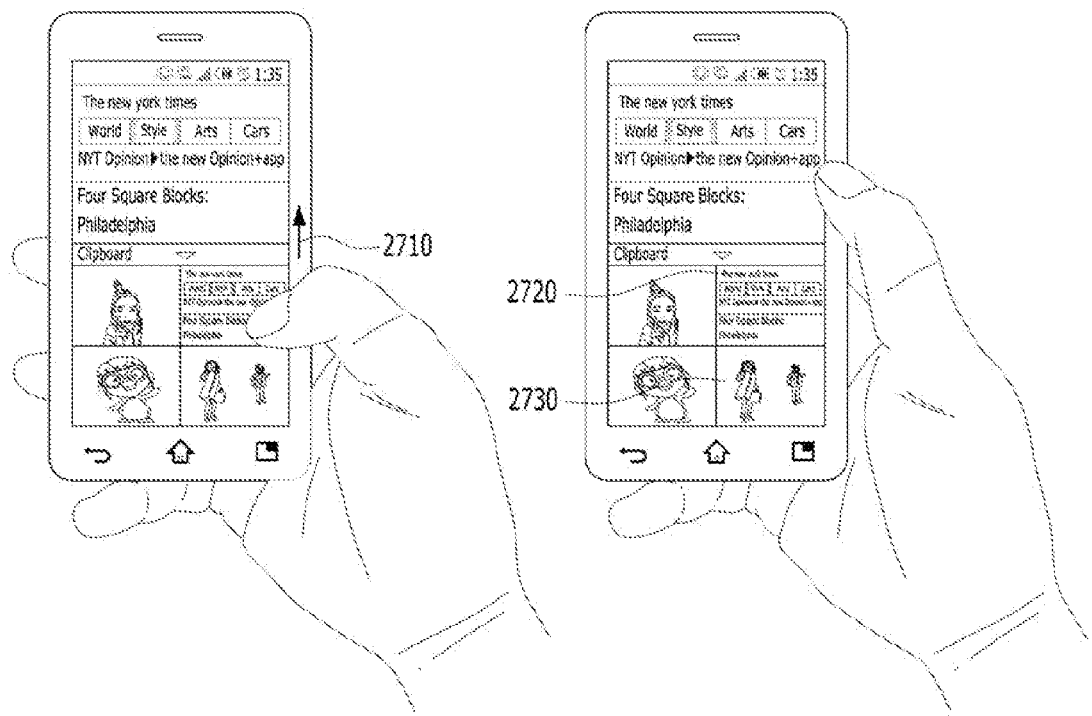

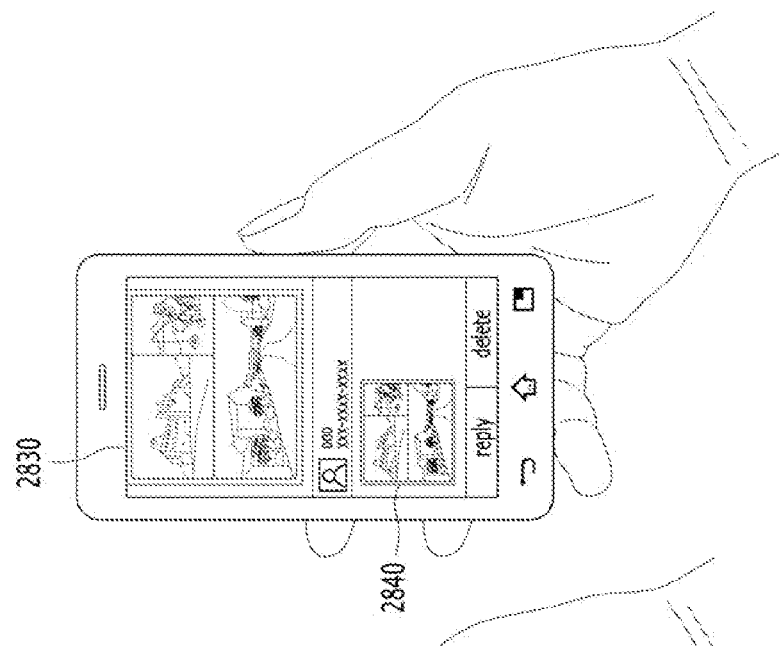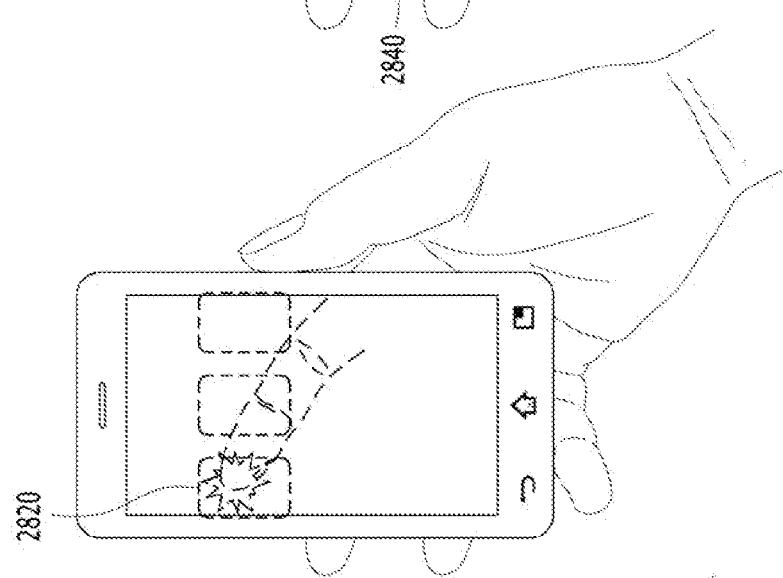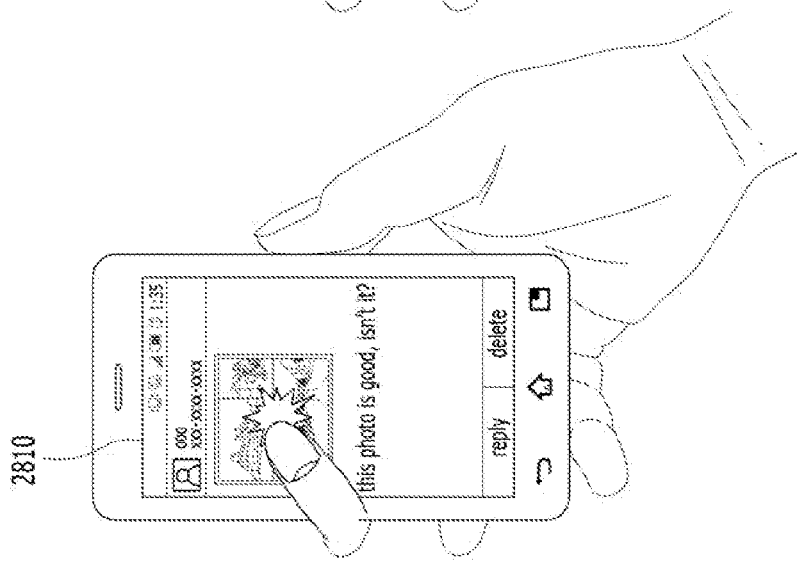

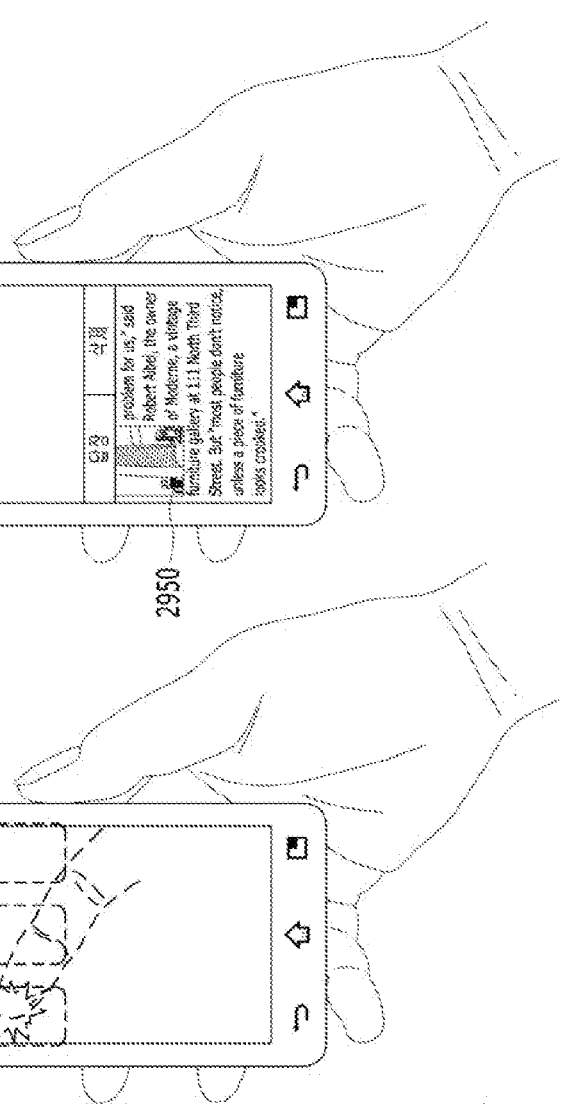

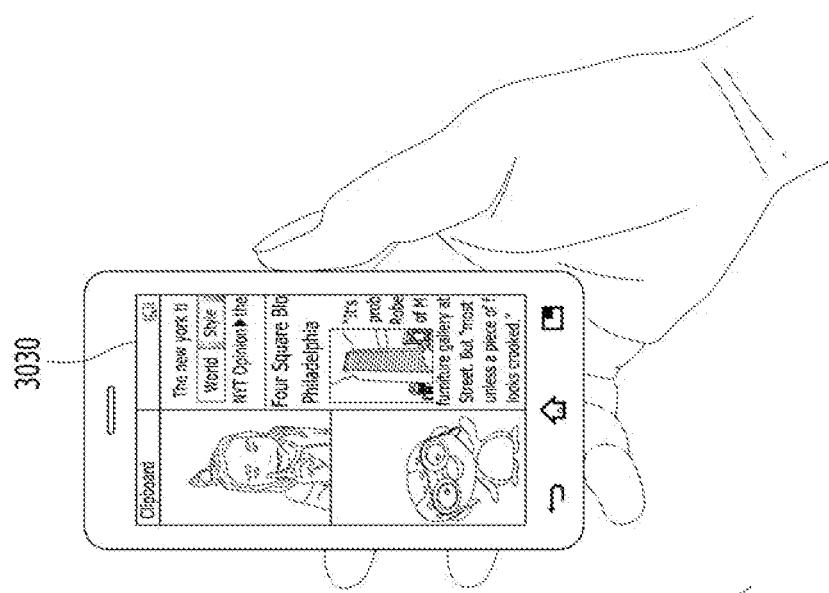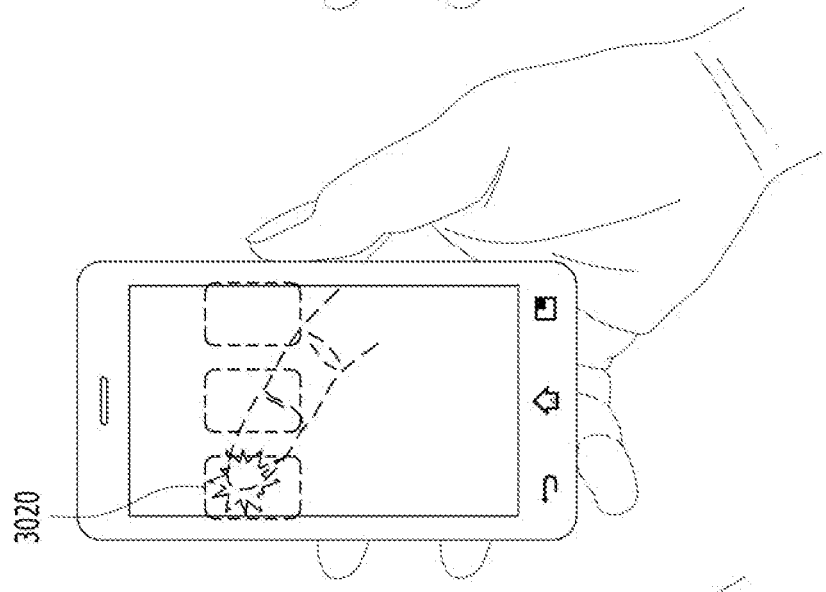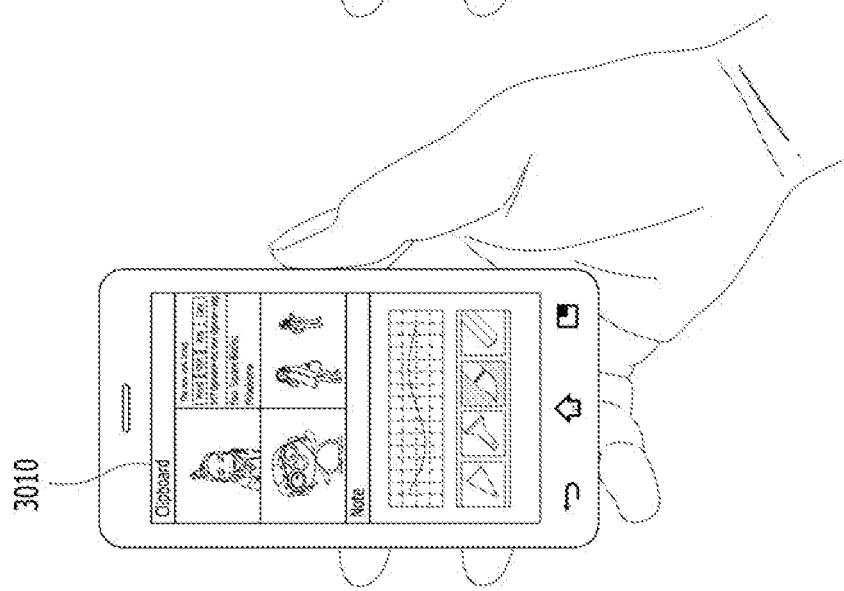

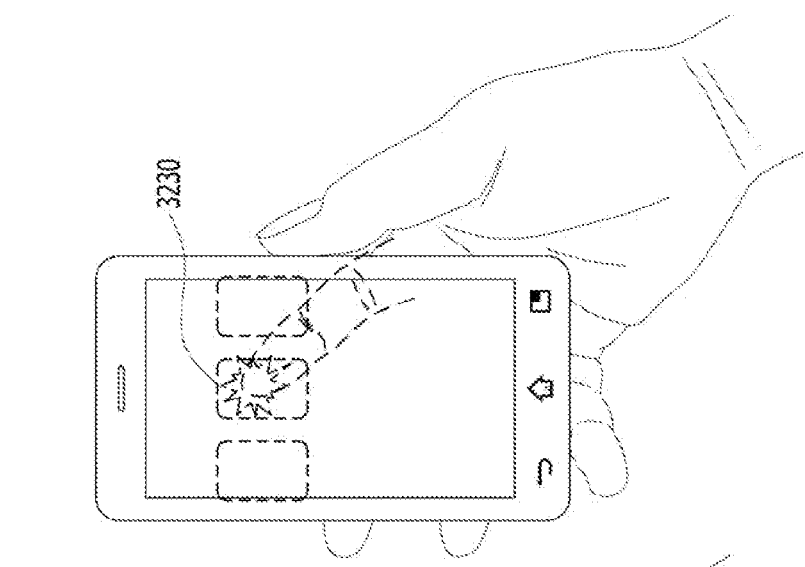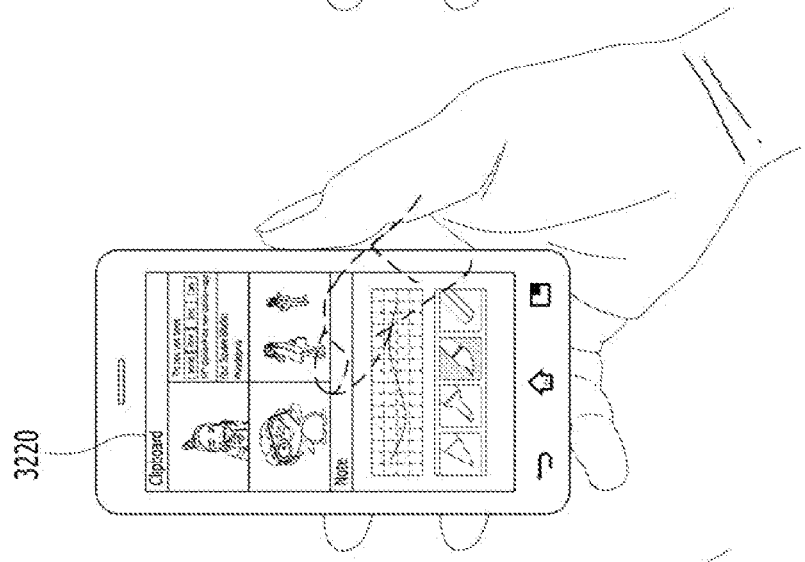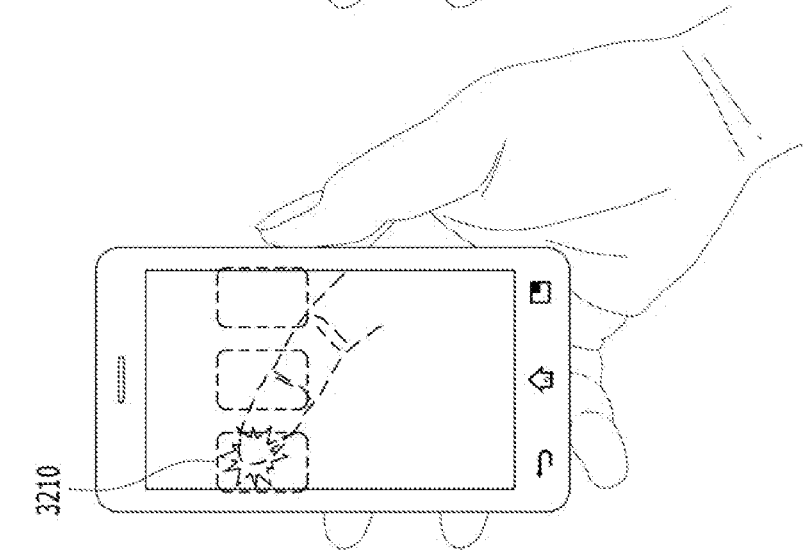

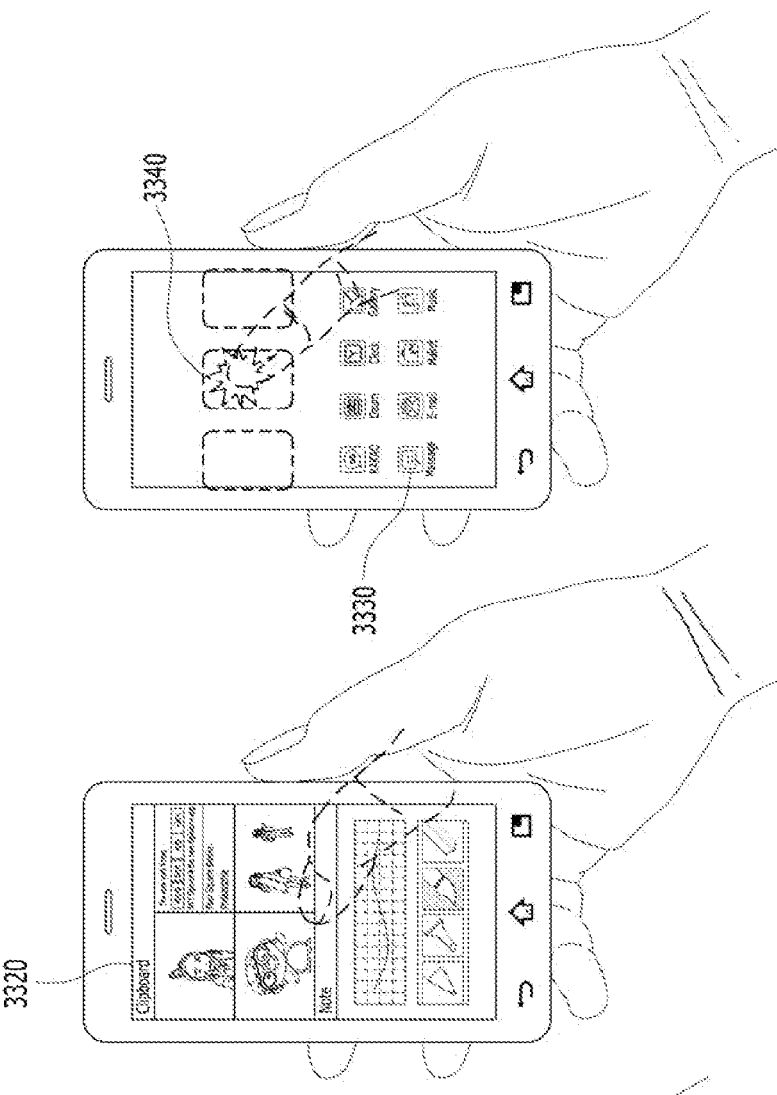

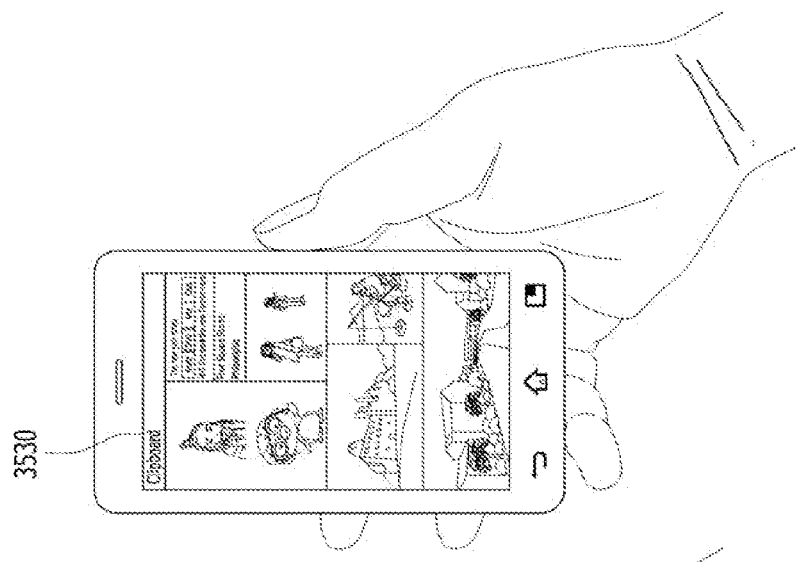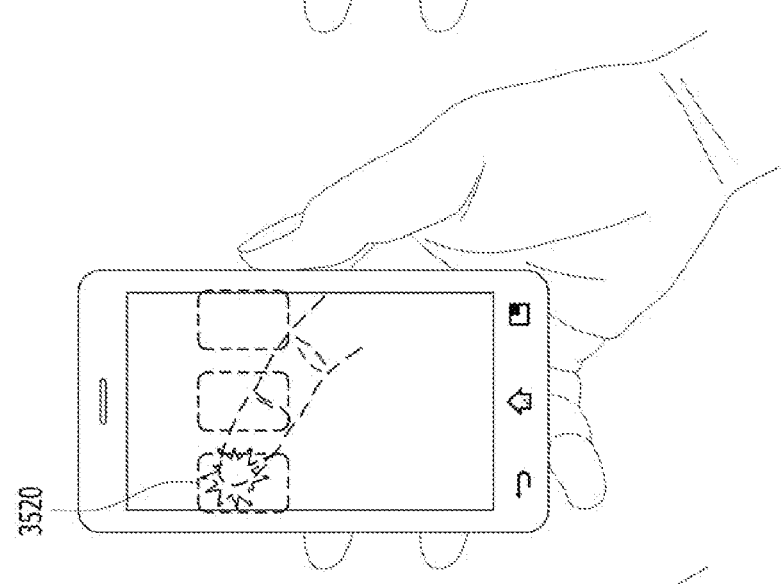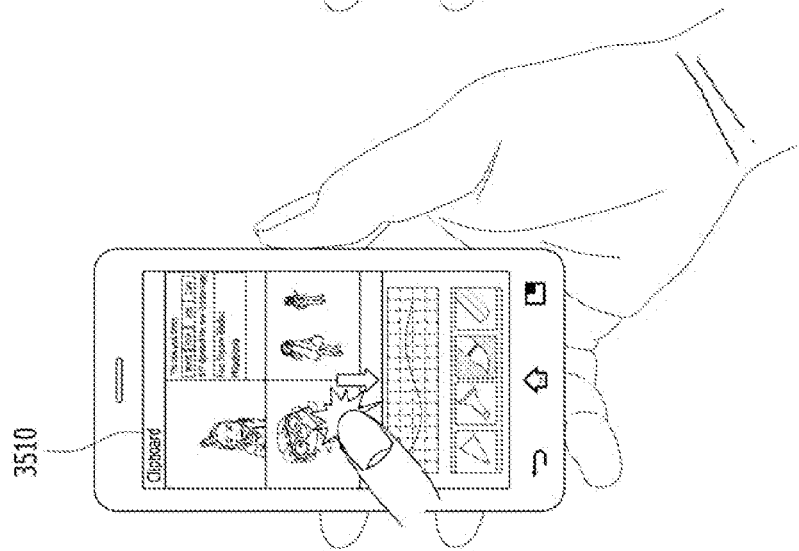

FIG. 43(a) FIG. 43(b) FIG. 43(c) FIG. 43(d) FIG. 43(e)

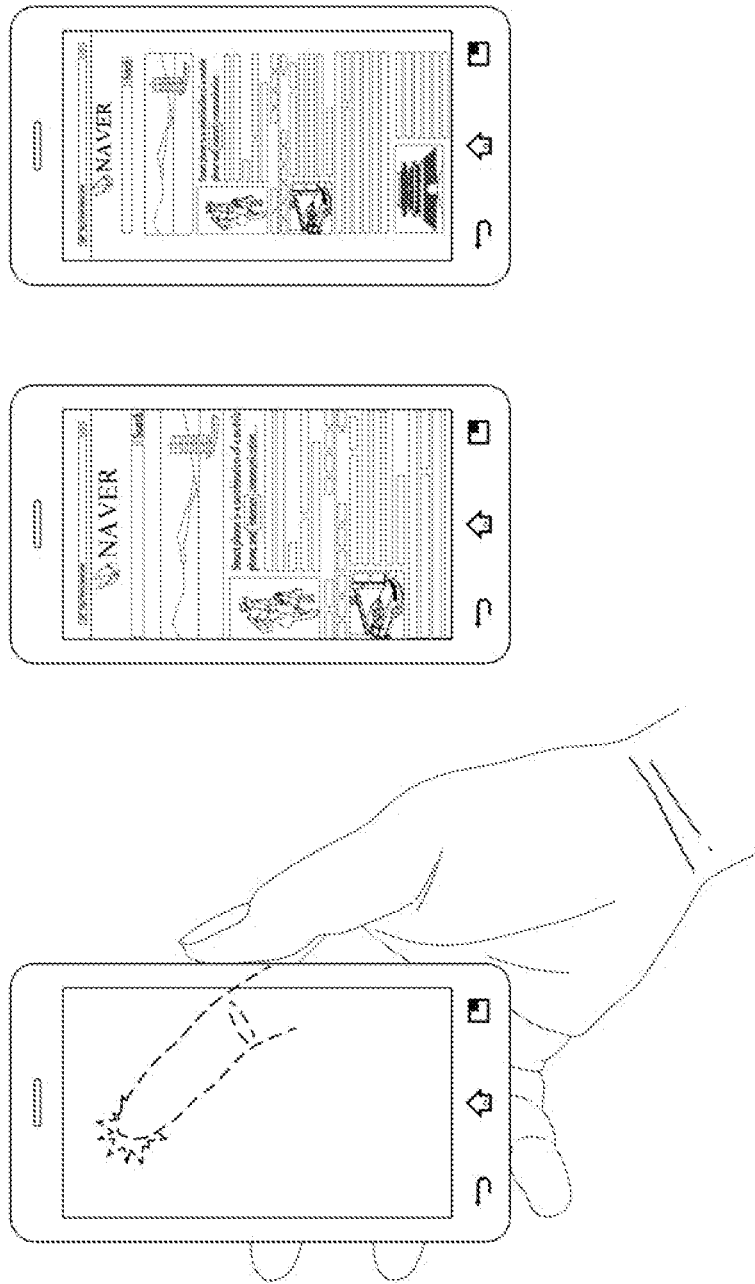

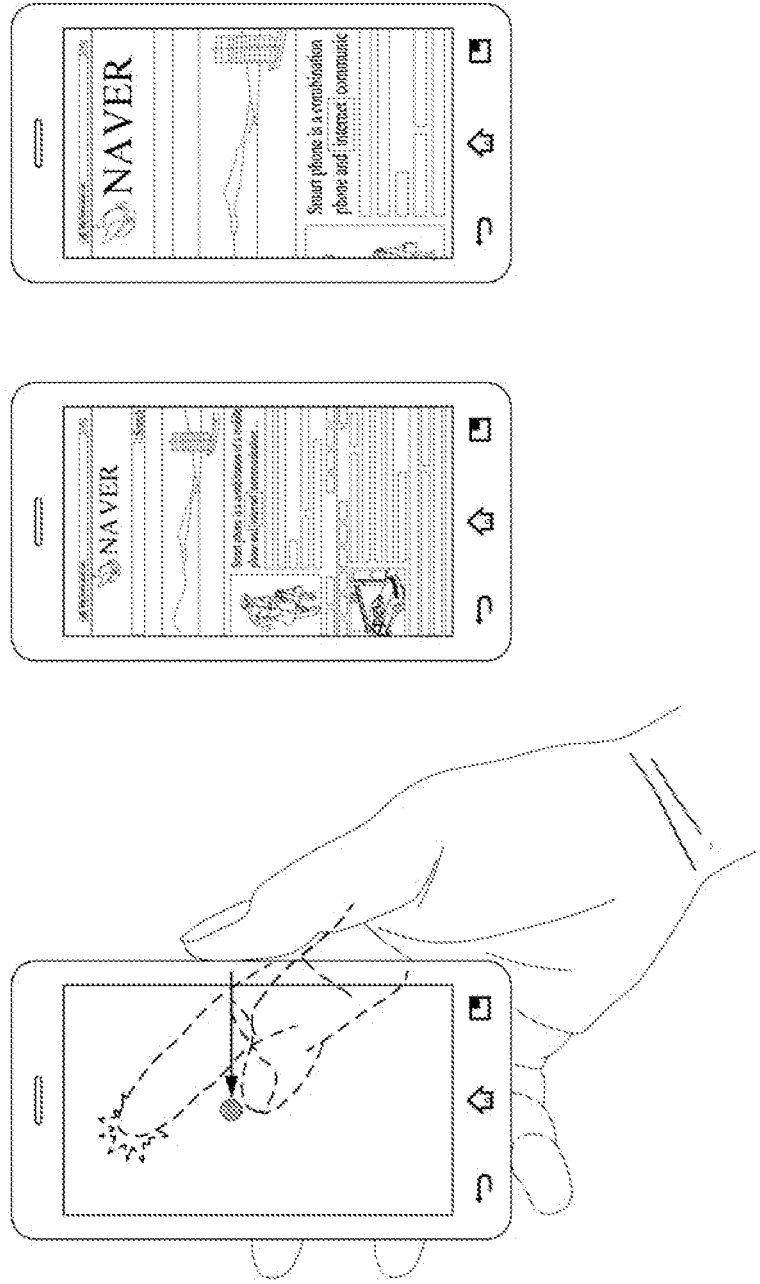

FIG. 48(d)
FIG. 48(c)
FIG. 48(b)
FIG. 48(a)
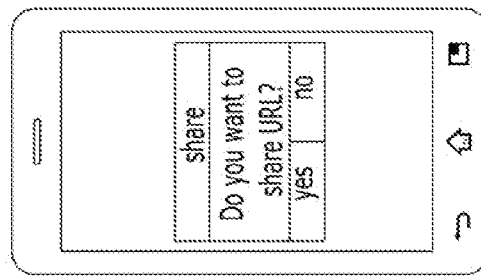
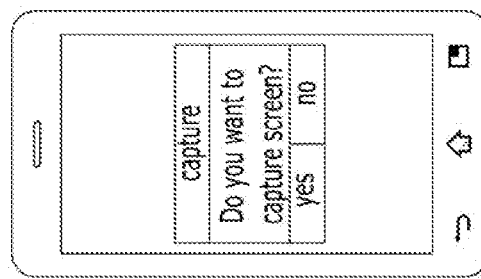
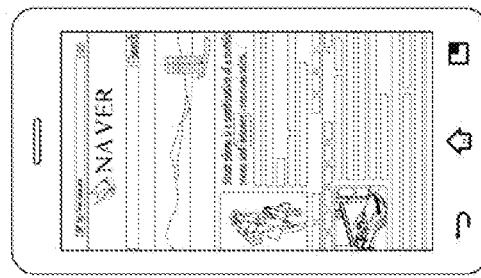
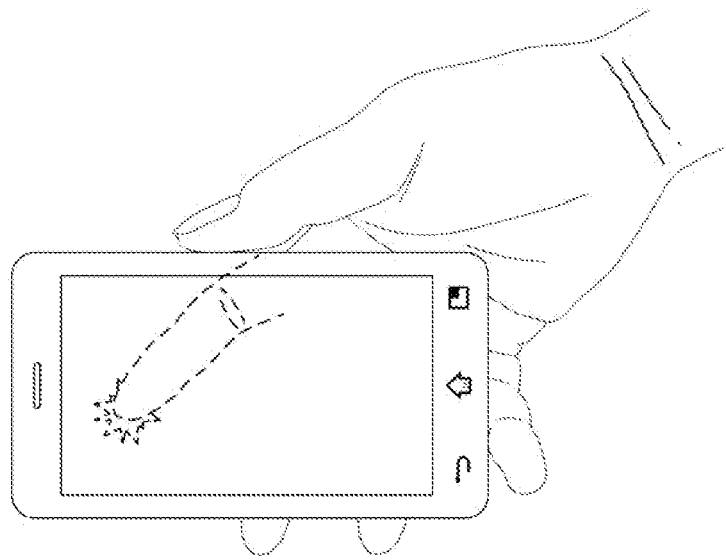

MOBILE TERMINAL CONTROLLED BY AT LEAST ONE TOUCH AND METHOD OF CONTROLLING THEREFOR

CROSS-REFERENCE TO RELATED APPLICATION

Pursuant to 35 U.S.C. §119(a), this application claims the benefit of earlier filing date and right of priority to Korean Patent Application No. 10-2014-0099012, filed on Aug. 1, 2014, the contents of which are hereby incorporated by reference herein in their entirety.

BACKGROUND OF THE INVENTION

1. Field of the Invention

The present invention relates to a mobile terminal enabling a user to more conveniently use the mobile terminal and a method of controlling therefor.

2. Discussion of the Related Art

A terminal can be classified into a mobile/portable terminal and a stationary terminal in accordance with whether the terminal is capable of being moved. Again, the mobile terminal can be divided into a handheld (type) terminal and a vehicle mounted terminal.

A function of a mobile terminal is diversifying. For instance, the function of the mobile terminal includes such a function as data and audio communication, capturing a picture and a video using a camera, audio recording, playing a music file using a speaker system and outputting an image or a video on a display unit. Some of the terminals may have an additional function such as playing an electronic game or perform a function of a multimedia player. In particular, a latest mobile terminal can receive a multicast signal providing such visual contents as a broadcast, a video and a television program.

As the function of the terminal is diversified, the terminal is implemented in a form of a multimedia player equipped with multiple functions such as capturing a picture or a video, playing a music file or a video file, playing a game, receiving a broadcast and the like.

In order to support and increase the function of the terminal, it may consider improving a structural part and/or a software part of the terminal.

Yet, most of legacy touch-based mobile terminals have limitedly used a touch screen only positioned at the front of the mobile terminal. Moreover, there was a problem of mandatorily using both hands to perform a delicate control in relation to zoom-in/zoom-out.

SUMMARY OF THE INVENTION

An object of the present invention is to solve the aforementioned problem and a different problem.

Another object of the present invention is to provide a technology capable of recognizing a touch of a user occurred on a specific position of a rear side of a mobile terminal without a separate touch panel of a rear side of the mobile terminal.

Another object of the present invention is to provide various UX/UI technologies based on a touch of a user recognized on a rear side of a mobile terminal.

The other object of the present invention is to promptly executing a predetermined specific function by combining a touch of a user recognized on a rear side of a mobile terminal and a touch of the user recognized on the front side of the mobile terminal with each other.

Technical tasks obtainable from the present invention are non-limited the above mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of controlling a mobile terminal controlled by at least one touch includes the steps of outputting a screen including at least one selected from the group consisting of a text data, an image data and a video data, detecting a first touch of a user via a first user interface module, capturing the outputted screen on the basis of the detected first touch, detecting a second touch of the user via a second user interface module and storing a partial area of the captured screen in a memory on the basis of the detected second touch.

To further achieve these objects and other advantages and in accordance with the purpose of the invention, as embodied and broadly described herein, according to a different embodiment, a mobile terminal controlled by at least one touch includes a memory configured to store at least one command in advance, a display module configured to output a screen including at least one selected from the group consisting of a text data, an image data and a video data, a first user interface module configured to detect a first touch of a user, a controller configured to execute a first command on the basis of the detected first touch and a second user interface module configured to detect a second touch of the user, wherein the controller is configured to control a second command to be executed on the basis of the detected second touch.

Advantage and effectiveness of a mobile terminal according to the present invention and a method of controlling therefor are described in the following.

According to at least one of embodiments of the present invention, it is able to recognize a touch of a user occurred on a specific position of a rear side of a mobile terminal without a separate touch panel of the rear side of the mobile terminal.

According to at least one of embodiments of the present invention, it is able to provide various UX/UI technologies based on a touch of a user recognized on a rear side of a mobile terminal.

According to at least one of embodiments of the present invention, it is able to promptly execute a predetermined specific function by combining a touch of a user recognized on a rear side of a mobile terminal and a touch of the user recognized on the front side of the mobile terminal with each other.

An additional scope to which the present invention is applicable is to be clearly understood by following detail explanation. Yet, since various changes and modifications within an idea and a scope of the present invention can be clearly understood by those skilled in the art, detailed explanation and such a specific embodiment as a preferred embodiment of the present invention should be understood as just a given example.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 is a diagram for a database storing multiple commands related to a rear side touch of a mobile terminal according to one embodiment of the present invention;

FIG. 10 is a flowchart for a method of controlling a mobile terminal according to one embodiment of the present invention;

FIGS. 11(a), 11(b) and 11(c) are diagrams for explaining a process of executing a screen capture by a mobile terminal according to one embodiment of the present invention;

FIGS. 14(a) and 14(b) are diagrams for a different example of sharing a captured screen by a mobile terminal according to one embodiment of the present invention;

FIGS. 15(a), 15(b) and 16 are diagrams for explaining one example of capturing a whole screen captured by a mobile terminal according to one embodiment of the present invention;

FIGS. 20(a), 20(b) and 20(c) are diagrams for a process of switching to a clipboard mode by a mobile terminal according to one embodiment of the present invention;

FIGS. 21(a), 21(b), 21(c), 22, 23(a), 23(b), 23(c) and 23(d) are diagrams for a process of editing a captured screen by a mobile terminal according to one embodiment of the present invention;

FIGS. 24(a), 24(b), 24(c), 25(a), 25(b), 25(c), 26(a), 26(b), 27(a), and 27(b) are diagrams for a method of additionally utilizing a clipboard mode by a mobile terminal according to one embodiment of the present invention;

FIGS. 28(a), 28(b) and 28(c) are diagrams for an overall process of executing multitasking by a mobile terminal according to a different embodiment of the present invention;

FIGS. 29(a), 29(b) and 29(c) are diagrams for a process of simultaneously executing a second application while a first application is executed by a mobile terminal according to a different embodiment of the present invention;

FIGS. 30(a), 30(b) and 30(c) are diagrams for a process of switching to a mode executing a single application only while multitasking is executed by a mobile terminal according to a different embodiment of the present invention;

FIGS. 31(a), 31(b), 31(c), 32(a), 32(b), 32(c), 33(a), 33(b), 33(c), 34(a), 34(b) and 34(c) are diagrams for a process of replacing an application of a specific area only while multitasking is executed by a mobile terminal according to a different embodiment of the present invention;

FIGS. 35(a), 35(b), 35(c), 36(a), 36(b), 36(c) and 36(d) are diagrams for a process of more promptly switching a screen while multitasking is executed by a mobile terminal according to a different embodiment of the present invention;

Figures 43A, 43B, 43C, 43D, 43E:
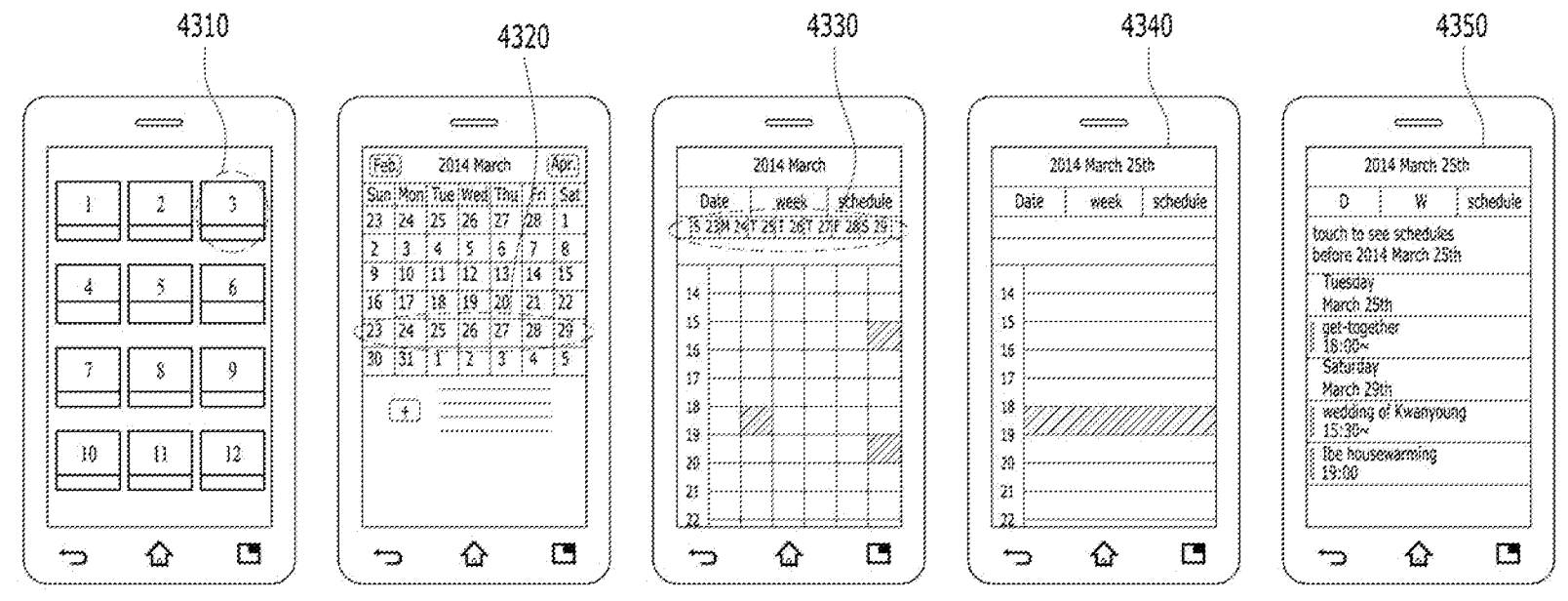

FIGS. 43(a), 43(b), 43(c), 43(d), 43(e), 44(a), 44(b), 44(c), 45(a), 45(b) and 45(c) are detail diagrams for a calendar executed by a mobile terminal according to a further different embodiment of the present invention based on FIGS. 37 and 38;

FIGS. 46(a), 46(b), 46(c), 47(a), 47(b), 47(c), 48(a), 48(b), 48(c), 48(d), 49(a), 49(b), 49(c), 49(d) and 49(e) are detail diagrams for a web browser executed by a mobile terminal according to a further different embodiment of the present invention based on FIGS. 37 and 38;

DETAILED DESCRIPTION OF THE INVENTION

Figure 1A:
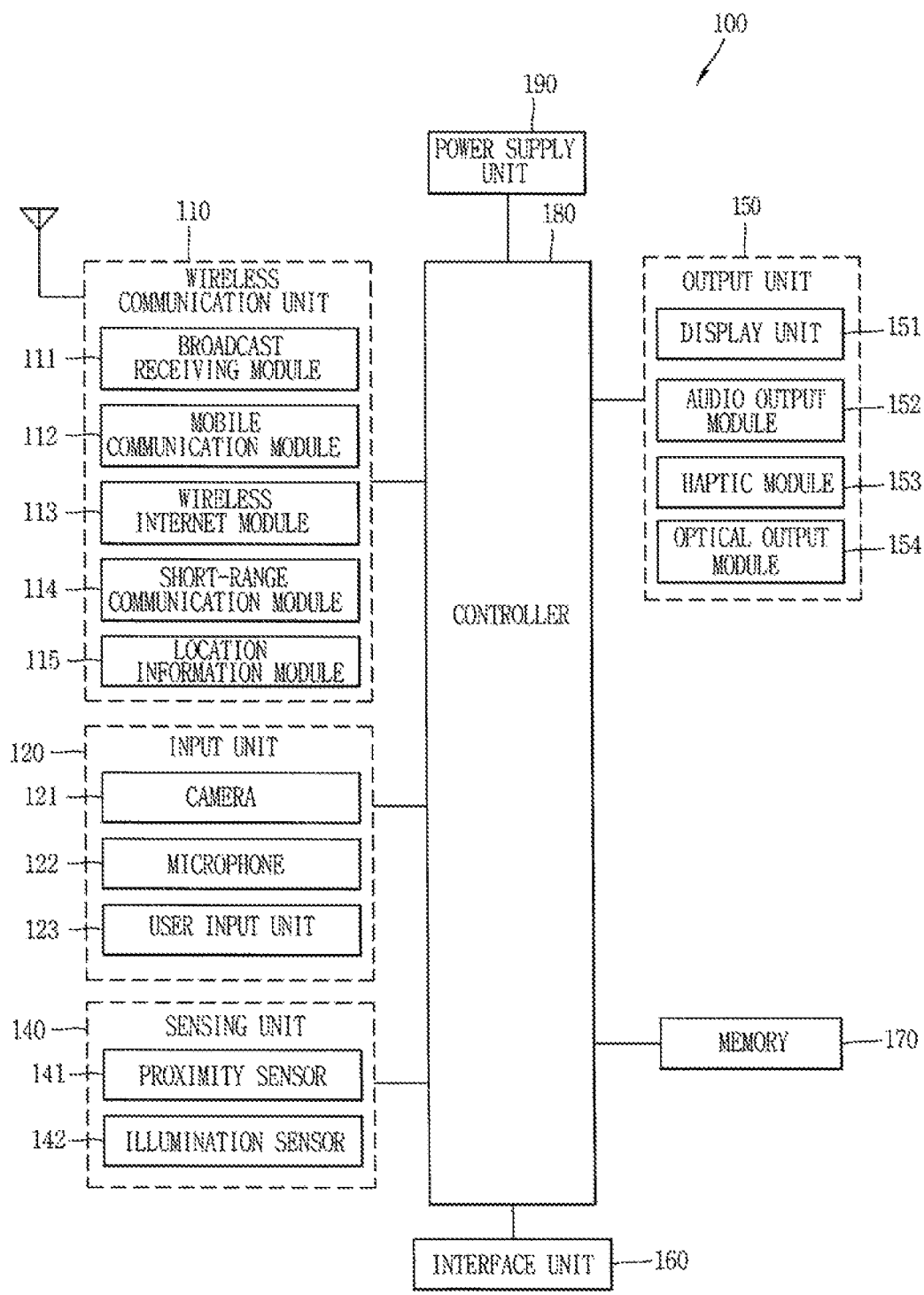
FIG. 1A is a block diagram for explaining a mobile terminal related to the present invention.

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably. And, in explaining embodiment disclosed in the present specification, if it is determined that detail explanation on a related technology known to public makes a point of the embodiment disclosed in the present specification unclear, the detail explanation can be omitted. And, the attached drawings are just intended to help easily understand the embodiment disclosed in the present specification. Hence, a technical idea disclosed in the present specification may be non-limited by the attached drawings. It should be understood as the attached drawings include all changes, equivalents and substitutes included in the idea of the present invention and a technical scope.

Moreover, a terminology, each of which includes such an ordinal number as $1^{st}$, $2^{nd}$ and the like, may be used to describe various components. In doing so, the various components should be non-limited by the corresponding terminologies, respectively. The terminologies are only used for the purpose of discriminating one component from other components.

In case that one component is mentioned as 'connected to' or 'accessing' another component, it may be connected to or access the corresponding component in direct. Yet, new component(s) may exist in between. On the other hand, in case that one component is mentioned as 'directly connected to' or 'directly accessing' another component, it should be understood that new component(s) may not exist in between.

And, the singular number representation used in the present specification may include the plural number representation unless mentioned clearly and differently in context.

In the present application, such a terminology as 'comprise', 'include' and the like should be construed not as excluding existence of one or more characteristics, a number, a step, an operation, a component, a part or a combination thereof or a possibility of addition in advance but as designating existence of a characteristic, a number, a step, a component, a part or a combination thereof written on the disclosure.

A mobile terminal explained in the present specification may include a mobile phone, a smartphone, a laptop computer, a terminal used for digital broadcast, a PDA (personal digital assistant), a PMP (portable multimedia player), a navigation, a slate PC, a tablet PC, an ultra-book, a wearable device (e.g., a smartwatch, a smart glasses, a HMD (head mounted display)) and the like.

Yet, except a case of applying a mobile terminal only, it is apparent to those who skilled in the art that a configuration according to embodiment of the present specification can also be applied to such a stationary terminal as a digital TV, a desktop computer, a digital signage and the like.

Figure 1B:
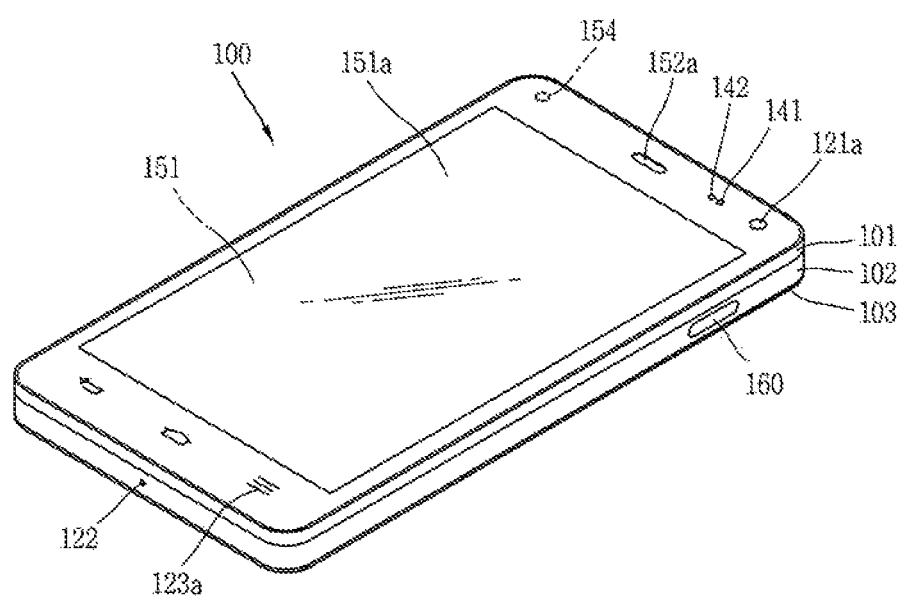
FIGS. 1B and 1C are conceptual diagrams for an example of a mobile terminal related to the present invention seen from directions different from each other.
Figure 1C:
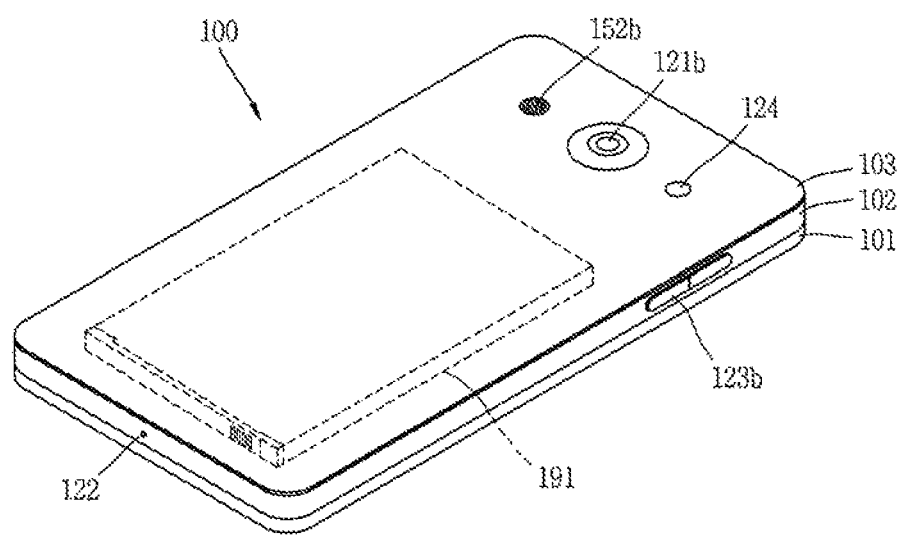

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100.

The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
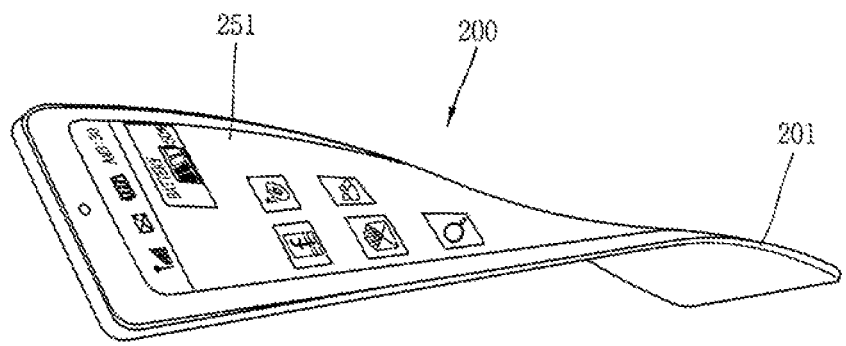
FIG. 2 is a conceptual diagram for explaining a different example of a transformable mobile terminal according to the present invention.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
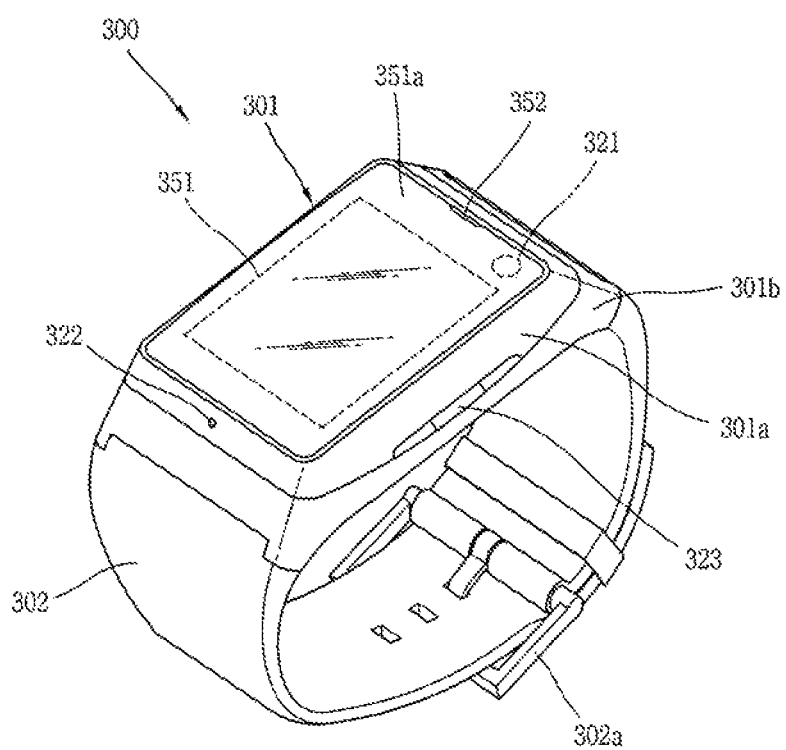
FIG. 3 is a perspective diagram for an example of a mobile terminal of a watch type related to a different embodiment of the present invention.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
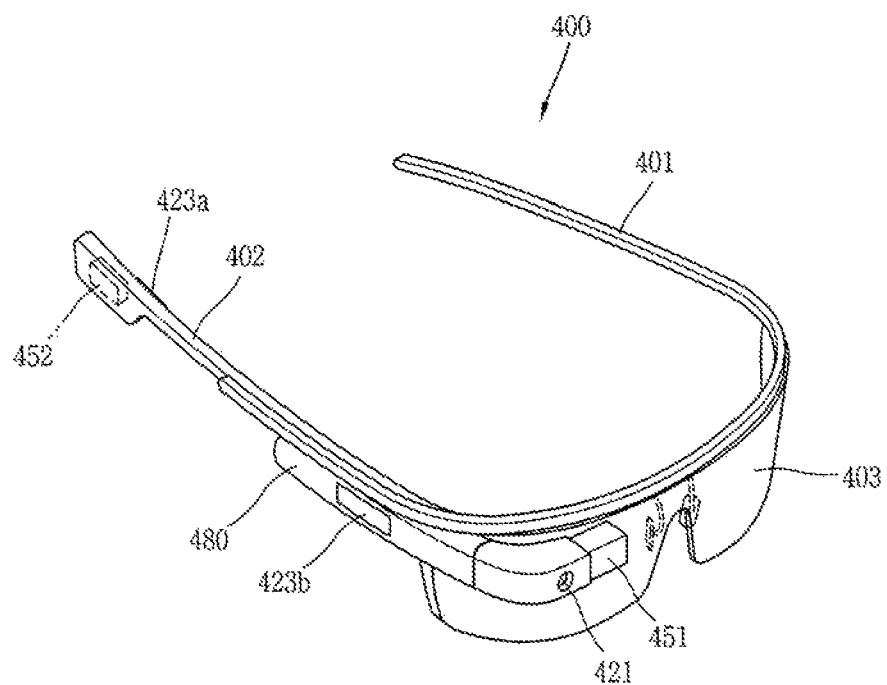
FIG. 4 is a perspective diagram for an example of a mobile terminal of a glasses type related to a further different embodiment of the present invention.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

In the following, a controlling method capable of being implemented in the aforementioned mobile terminal and embodiments related to the controlling method are explained with reference to attached drawings. It is apparent to those skilled in the art that the present invention can be specified into a different specific form within a range of an idea and an essential characteristic of the present invention.

A display unit 151 of a mobile terminal 100 according to the present invention can include a front output unit exposed to the front side of the mobile terminal and at least one side output unit exposed to the side of the mobile terminal.

Figure 5A:
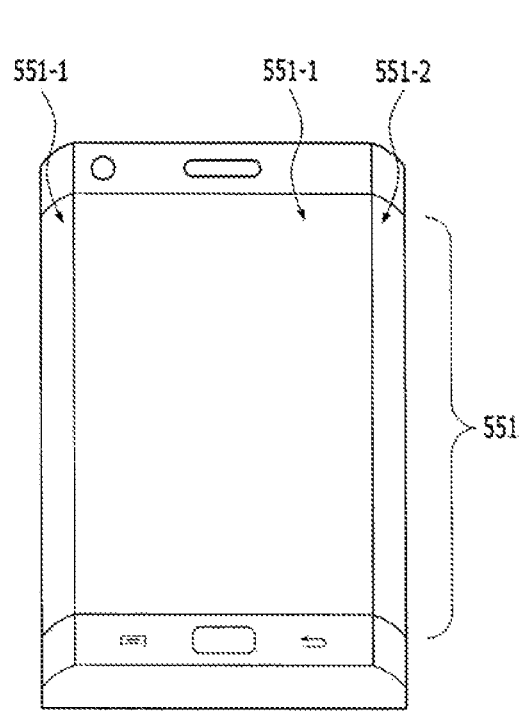
FIGS. 5(a) and 5(b) are diagrams for explaining an example of a front output unit and a side output unit of a mobile terminal related to the present invention.
Figure 5B:
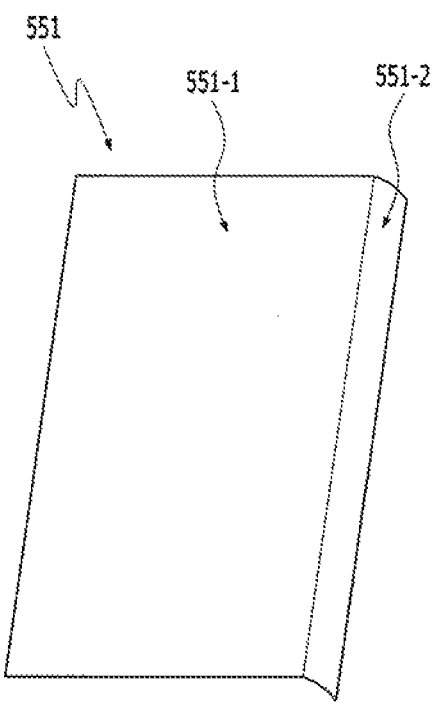

As an example, FIGS. 5(*a*) and 5(*b*) are diagrams for explaining an example of a front output unit and a side output unit of a mobile terminal related to the present invention. As shown in an example of FIG. 5 (*a*), the front output unit 551-1 may correspond to a display area exposed to the front side of the mobile terminal and the side output unit 551-2 may correspond to a display area exposed to the side of the mobile terminal.

The front output unit 551-1 and the side output unit 551-2 can be implemented by separate electronic components, respectively. On the contrary, if the display unit corresponds to a flexible display capable of being freely bent, the front output unit 551-1 and the side output unit 551-2 can be formed in a manner of bending at least one end of the flexible display.

As an example, FIG. 5 (*b*) shows an example that the front output unit 551-1 and the side output unit 551-2 are formed in a manner of bending at least one end of the flexible display. As shown in the example of FIG. 5 (*b*), when at least one end of the flexible display unit 551 is bent, a flat area and a bent area form the front output unit 551-1 and the side output unit 551-2, respectively.

As shown in the example of FIG. 5 (*a*), the side output unit 551-2 may exist in both a left side and a right side of the mobile terminal Or, as shown in the example of FIG. 5 (*b*), the side output unit 551-2 may exist in either the left side or the right side of the mobile terminal.

The present invention can be more easily implemented when the display unit 551 is implemented by a touch screen. Hence, in explaining the present invention, assume that the display unit 551 corresponds to a touch screen. Moreover, the present invention is associated with unlock of the display unit 551.

Meanwhile, in the following, schematic contents related to a rear touch (back tap) proposed by the present invention are described with reference to FIG. 6 to FIG. 8. And, one embodiment of the present invention shall be described later with reference to FIG. 9 to FIG. 27, a different embodiment of the present invention shall be described later with reference to FIG. 28 to FIG. 36 and a further different embodiment of the present invention shall be described later in detail with reference to FIG. 37 to FIG. 52. Meanwhile, for clarity, although the embodiments are explained in a manner of being distinguished from each other, it is apparent to those skilled in the art that each of the embodiments can be combined with each other. It is apparent that the combination of the embodiments also belongs to a scope of the present invention.

Figure 6:
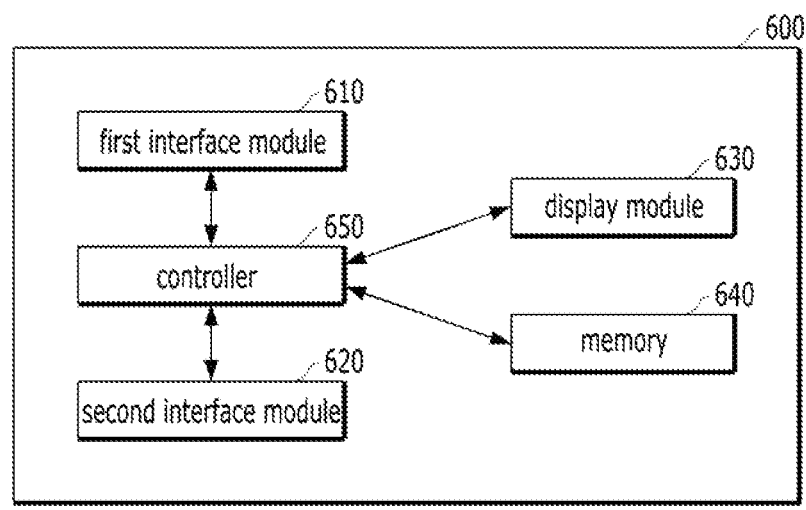
FIG. 6 is a diagram for an inside module of a mobile terminal related to the present invention.

FIG. 6 is a diagram for an inside module of a mobile terminal related to the present invention. Of course, the mobile terminal depicted in FIG. 6 can be complementally interpreted with reference to previous drawings.

As shown in FIG. 6, a mobile terminal 600 includes a first interface module 610, a second interface module 620, a display module 630, a memory 640, a controller 650 and the like.

The memory 610 stores at least one command in advance. In relation to this, it shall be described in detail with reference to FIG. 9. The display module 630 outputs a screen including at least one selected from the group consisting of a text data, an image data and a video data.

The first interface module 610 is configured to detect a first touch of a user. For instance, it is possible to design the first touch to be recognized on a specific position of a rear side of the mobile terminal in a manner of utilizing an acceleration sensor without using a legacy touch panel or a touch screen. Hence, the first touch can be called a back tap in a manner of being distinguished from a second touch described later. And, since a separate touch panel or a touch screen is not utilized, there may exist a technical merit in that there is no cost generated by an additional design of hardware.

The controller 650 executes a first command on the basis of the detected first touch. Moreover, the second user interface module 620 is designed to detect a second touch of a user. For instance, the second touch indicates a general touch signal recognized on the front of the mobile terminal via a touch panel or a touch screen. And, the controller 650 is designed to control a second command to be executed on the basis of the detected second touch.

For instance, the first command corresponds to a command reducing a partial area of the outputted screen and the second command corresponds to a command enlarging a specific area of the outputted screen.

As a different example, the first command corresponds to a command capturing the outputted screen and the second command corresponds to a command storing a partial area of the captured screen in the memory.

As a further different example, the controller 650 captures an outputted screen on the basis of timing of the detected first touch and determines the partial area on the basis of a position of the detected second touch.

The first user interface module 610 is associated with a specific area of a rear side of the mobile terminal 600 and is designed to recognize one time touch point of a user only. On the contrary, the second user interface module 620 is associated with a whole area of a front of the mobile terminal 600 and may be designed to recognize a distance, speed and a direction of a contiguous touch of a user.

The first user interface module 610 is designed to recognize at least two or more areas in a manner of distinguishing the at least two areas from each other. In relation to this, it shall be described later with reference to FIG. 7.

If a third touch of a user is detected on a first area via the first user interface module 610, the display module 630 displays at least one option to transmit a graphic image corresponding to the partial area stored in the memory 640 to an external device. This is relevant to one embodiment of the present invention and shall be described later with reference to FIG. 9 to FIG. 27.

If the third touch of the user is detected on a second area via the first user interface module 610, the display module 630 displays at least one option to edit a graphic image corresponding to the partial area stored in the memory 640. This is relevant to one embodiment of the present invention and shall be described later with reference to FIG. 9 to FIG. 27.

If the third touch of the user moving in a first direction is detected via the second user interface module 620, the display module 630 displays at least one option to transmit a graphic image corresponding to the partial area stored in the memory 640 to an external device. This is relevant to one embodiment of the present invention and shall be described later with reference to FIG. 9 to FIG. 27.

If the third touch of the user moving in a second direction is detected via the second user interface module 620, the display module 630 displays at least one option to edit a graphic image corresponding to the partial area stored in the memory 640. This is relevant to one embodiment of the present invention and shall be described later with reference to FIG. 9 to FIG. 27.

Figure 7:
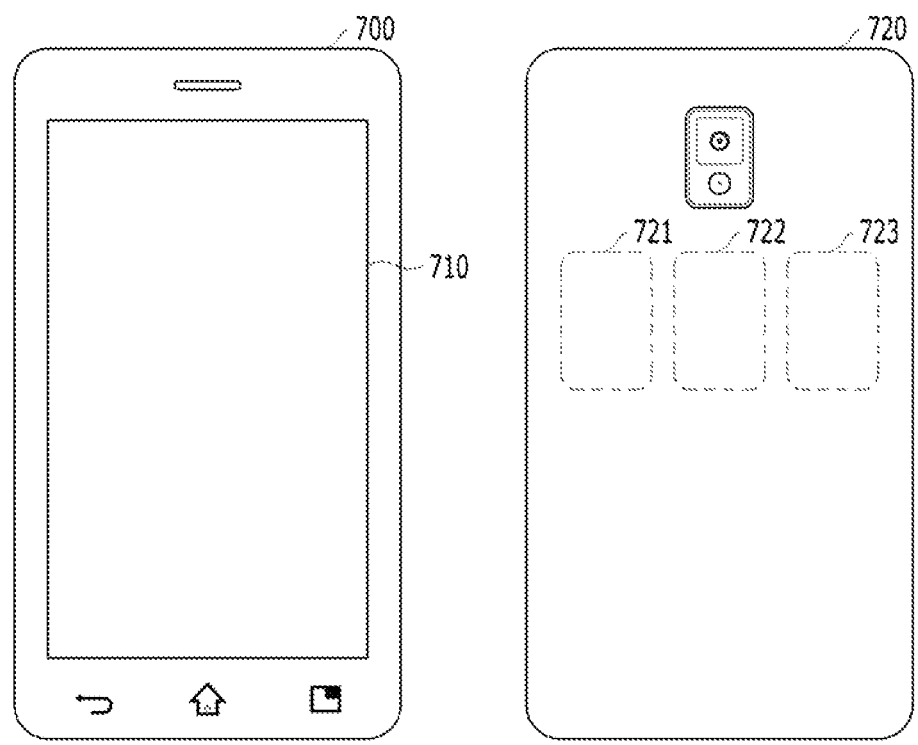
FIG. 7 is a diagram for a front side and a rear side of a mobile terminal related to the present invention.

FIG. 7 is a diagram for a front side and a rear side of a mobile terminal related to the present invention. A mobile terminal 700 shown in FIG. 7 can be implemented with reference to the aforementioned FIG. 1 to FIG. 6.

As shown in FIG. 7 (a), the mobile terminal 700 related to the present invention includes a touch screen 710 in the front of the mobile terminal. It is able to recognize a contiguous touch signal of a user using a touch panel connected with the touch screen 710 and a recognition sensor.

On the contrary, as shown in FIG. 7 (b), a rear side 720 of the mobile terminal related to the present invention is divided into three areas 721/722/723. The three areas detect a temporary touch of a user using an acceleration sensor only without a touch panel. The temporary touch of the user can be called a back tap. In particular, one characteristic of the present invention is to provide a new UX/UI to a user in a manner of combining a touch recognized on the front 710 of the mobile terminal and a touch recognized on the rear side 720 of the mobile terminal with each other. Moreover, various functions are performed based on a back tap recognized on each of the areas 721/722/723 positioned at the rear side 720 of the mobile terminal Commands related to the various functions are stored in the memory in advance or can be edited by a user.

Figure 8:
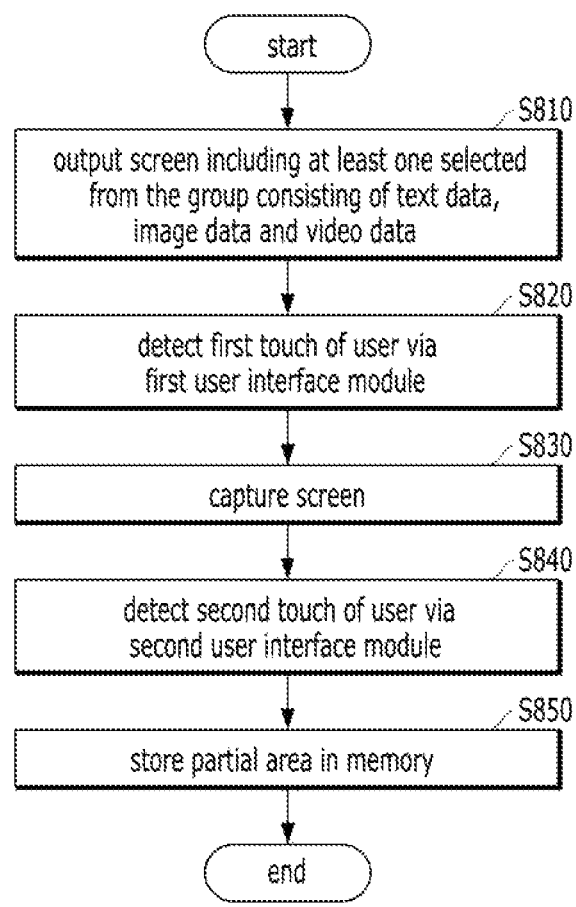
FIG. 8 is a flowchart for a method of controlling a mobile terminal related to the present invention.

FIG. 8 is a flowchart for a method of controlling a mobile terminal related to the present invention. Deleting or changing a part of steps shown in FIG. 8, although it is not depicted in FIG. 8, adding a characteristic capable of being extracted by those skilled in the art via the present specification also belong to the scope of right of the present invention.

First of all, a mobile terminal related to the present invention outputs a screen including at least one selected from the group consisting of a text data, an image data and a video data [S810]. A first touch of a user is detected via a first user interface module [S820] and the outputted screen is captured on the basis of the detected first touch [S830]. Of course, replacing the step S830 with a different characteristic described in the present specification also belongs to the scope of right of the present invention.

Moreover, the mobile terminal detects a second touch of the user via a second user interface module [S840] and stores a partial area of the captured screen in the memory [S850]. Of course, replacing the step S850 with a different characteristic described in the present specification also belongs to the scope of right of the present invention.

FIG. 9 is a diagram for a database storing multiple commands related to a rear side touch of a mobile terminal according to one embodiment of the present invention. As shown in FIG. 9, each of functions, which is executed according to the number of rear side touch (back tap) and an area on which a first touch is positioned (721, 722 or 723 in FIG. 7), is stored in the memory. Moreover, restricting each of the functions to be executed in a specific mode (e.g., internet mode) only also belongs to the scope of right of the present invention. And, although it is not depicted in FIG. 9, performing a different function according to a relation (combination) with a front side touch (second touch) as well as the rear side touch (first touch) corresponds to one characteristic of the present invention.

For instance, if a rear side is touched (back tap) one time in the internet mode, a specific area is enlarged irrespective of an area on which the back tap is performed. If the rear side is touched twice, the specific area is reduced.

On the contrary, irrespective of the number of back tap, if an area on which the back tap is recognized corresponds to a first area, a captured screen is simply displayed. If the area on which the back tap is recognized corresponds to a second area, the captured screen is transmitted to an external device. If the area on which the back tap is recognized corresponds to a third area, the mobile terminal is designed to be switched to an editing mode.

Meanwhile, FIG. 9 to FIG. 27 described in the following are associated with one embodiment of the present invention and describes a process of performing a screen capture using a back tap in detail. Moreover, FIG. 28 to FIG. 36 described in the following are associated with a different embodiment of the present invention and describes a process of performing multitasking (or executing multi applications) using a back tap in detail. And, FIG. 37 to FIG. 52 described in the following are associated with a further different embodiment of the present invention and describes a process of enlarging/reducing a specific area using a back tap in detail.

FIG. 10 is a flowchart for a method of controlling a mobile terminal according to one embodiment of the present invention. Although FIG. 10 shows a back tap recognized on a rear side of the mobile terminal, providing a different function in a manner of combining a touch signal recognized on the front side and the back tap recognized on the rear side of the mobile terminal with each other also belongs to the scope of right of the present invention.

As shown in FIG. 10, a mobile terminal according to one embodiment of the present invention executes a web browser [S1010]. The mobile terminal determines whether a back tap signal is received on a first area of a rear side of the mobile terminal [S1020].

As a result of the step S1020, if the back tap signal is received, the mobile terminal captures a currently outputted web browser screen [S1030]. A captured image is stored in a memory [S1040]. Of course, it may omit the step S1040.

Subsequently, the mobile terminal determines whether a back tap signal is received on a different area except the first area of the mobile terminal [S1050]. Of course, determining whether the back tap signal is recognized on the first area instead of the different area also belongs to the scope of right of the present invention.

As a result of the step S1050, when the back tap signal is received, if the back tap signal is recognized on a second area of the rear side of the mobile terminal, the mobile terminal executes an editing mode for a captured screen [S1060]. On the contrary, as a result of the step S1050, when the back tap signal is received, if the back tap signal is recognized on a third area of the rear side of the mobile terminal, the mobile terminal executes a mode configured to transmit the captured screen to an external [S1070].

FIGS. 11(a), 11(b) and 11(c) are diagrams for explaining a process of executing a screen capture by a mobile terminal according to one embodiment of the present invention. As shown in FIGS. 11(a), 11(b) and 11(c), the mobile terminal provides a quick screen capture function using a back tap which is recognized on a rear side of the mobile terminal.

As shown in FIG. 11 (a), the mobile terminal is executing a web browser. In this case, as shown in FIG. 11 (b), assume that a touch is recognized on a specific area 1110 of a rear side of the mobile terminal. In this case, the mobile terminal extracts a command corresponding to a back tap with reference to a database stored in a memory and performs a function according to the command. In particular, as shown in FIG. 11 (c), the mobile terminal displays a captured screen 1120 in a manner of capturing a screen shown in FIG. 11 (a) as it is. Moreover, in order to promptly enter a different mode, displaying both a first option 1121 capable of deleting the captured screen and a second option 1122 capable of returning to a previous web page also corresponds to one characteristic of the present invention.

Figure 12B:
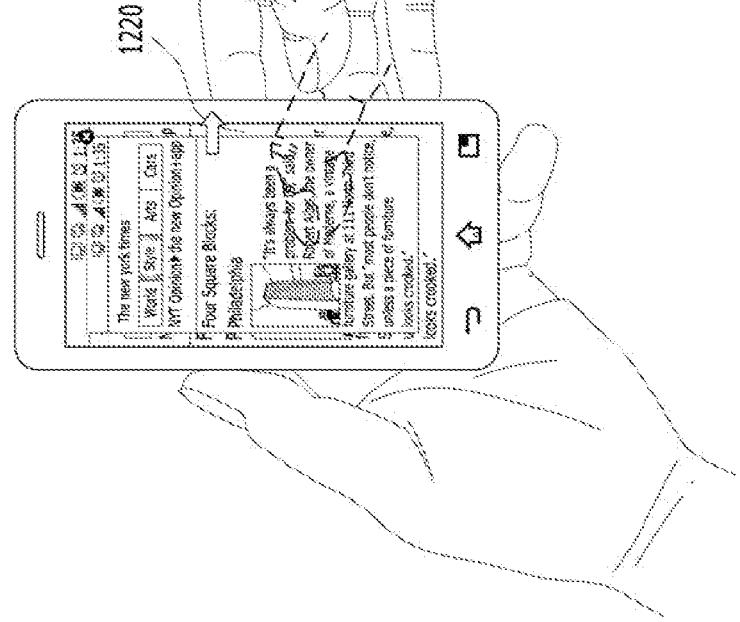
FIGS. 12(a), 12(b), and 13 are diagrams for one example of sharing a captured screen by a mobile terminal according to one embodiment of the present invention.
Figure 12A:
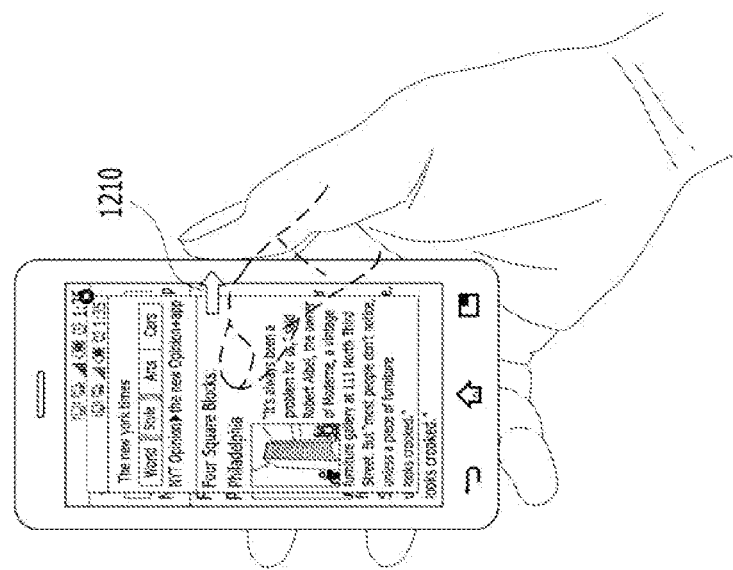
Figure 13:
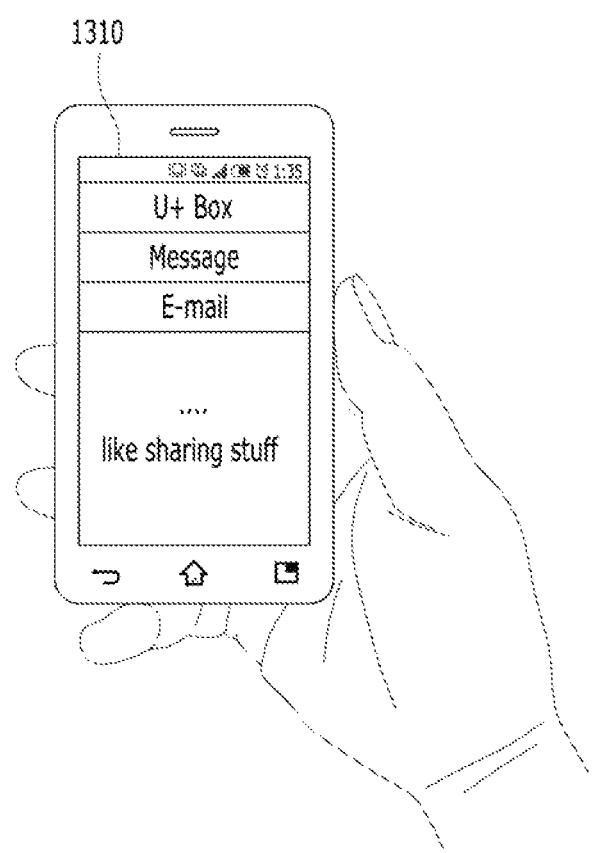

FIGS. 12(a), 12(b), and 13 are diagrams for one example of sharing a captured screen by a mobile terminal according to one embodiment of the present invention. In the following, a process of promptly switching to a sharing mode in a state that a screen is captured as shown in FIG. 11 is explained.

As depicted in FIG. 12 (a), a mobile terminal recognizes a front side touch signal of a user contiguously touching the front side in a direction of one side 1210. A command associated with the front side touch signal is stored in a memory. Hence, as shown in FIG. 13, a list 1310 including options capable of sharing a captured screen is displayed. In particular, FIG. 12 (a) shows a process of promptly accessing a sharing mode using one hand by the user.

On the contrary, as depicted in FIG. 12 (b), the mobile terminal recognizes a front side touch signal of a user contiguously touching the front side in a direction of one side 1220. Unlike FIG. 12 (a), both hands are used in FIG. 12 (b). After the front touch signal according to FIG. 12 (b) is recognized, as shown in FIG. 13, a list 1310 including options capable of sharing a captured screen is displayed.

FIGS. 14(a) and 14(b) are diagrams for a different example of sharing a captured screen by a mobile terminal according to one embodiment of the present invention. Unlike FIG. 12 and FIG. 13, in FIG. 14, assume that there exists a different device in the vicinity of a mobile terminal according to one embodiment of the present invention. And, the mobile terminal 1410 according to one embodiment of the present invention and the different device 1420 are connected with each other via NFC (near field communication), Wi-Fi direct or the like.

Hence, when the two devices are connected with each other via the near field communication, if the touch signal mentioned earlier in FIG. 12 is recognized, as shown in FIG. 14, the mobile terminal transmits a captured screen to the different device 1420.

Figure 16:
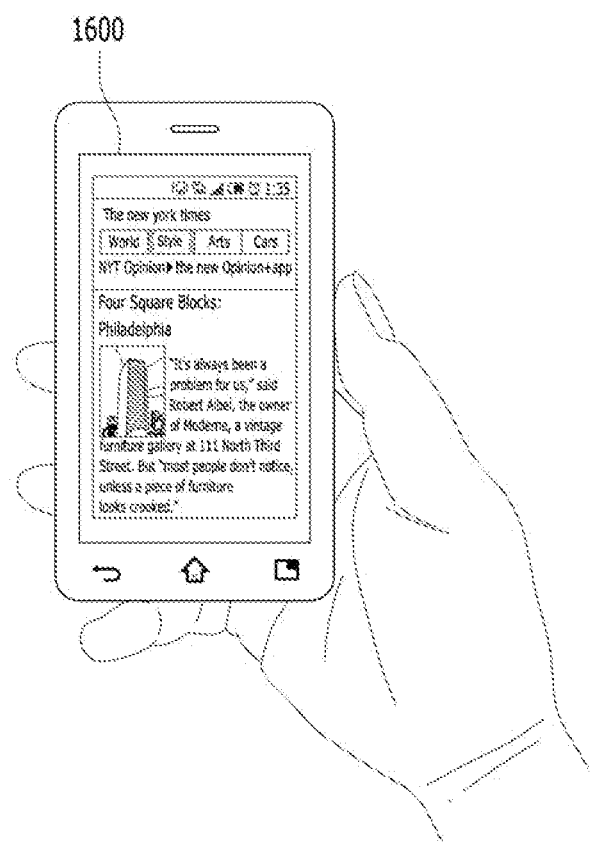
Figures 17A, 17B:
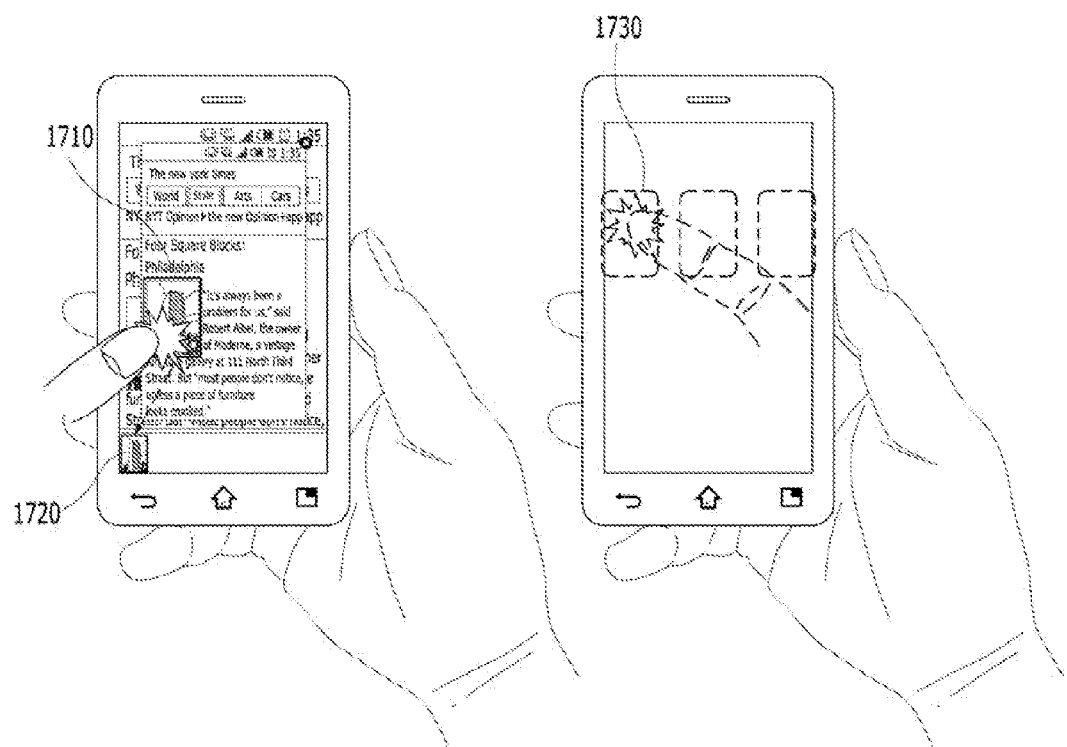
FIGS. 17(a), 17(b), 18(a) and 18(b) are diagrams for explaining a different example of capturing a whole screen captured by a mobile terminal according to one embodiment of the present invention.
Figures 18A, 18B:
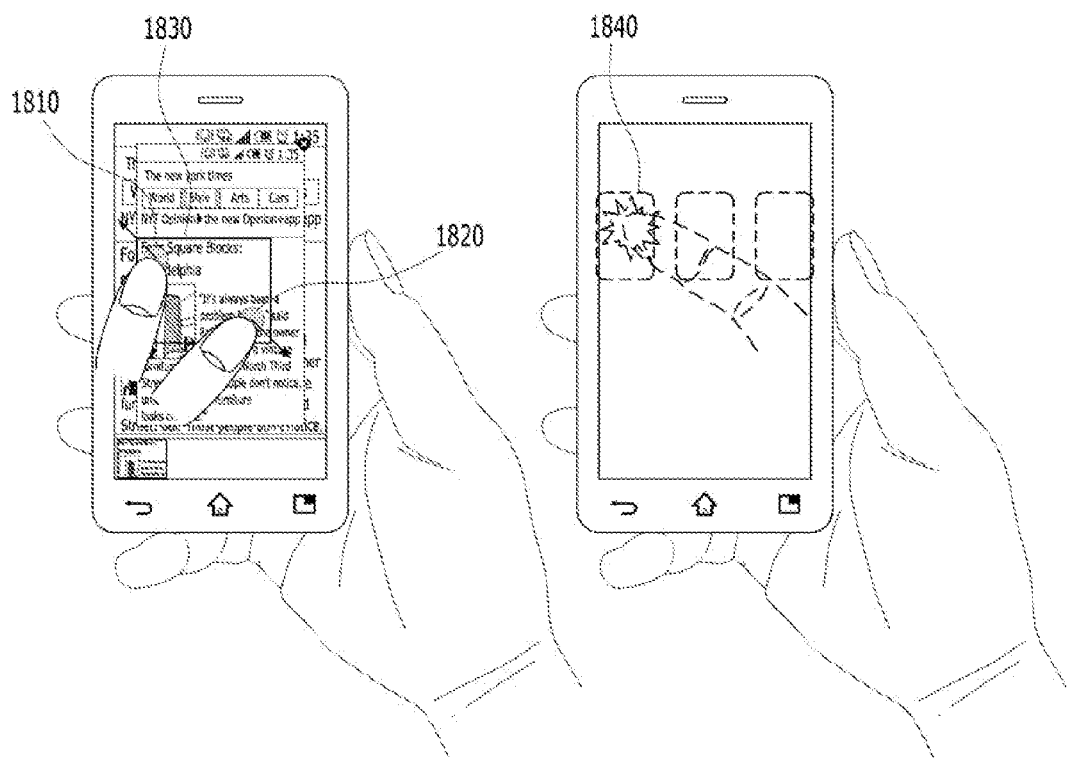

FIGS. 15(a), 15(b) and 16 are diagrams for explaining one example of capturing a whole screen captured by a mobile terminal according to one embodiment of the present invention.

As shown in FIG. 15 (a), when a random web page is captured, if a front side touch signal contiguously touching the front side in a specific direction 1510 is recognized, as shown in FIG. 16, the mobile terminal automatically stores a whole 1600 of the captured screen in a memory. In particular, in FIG. 15 (a), assume a case that one hand is used only.

On the contrary, in FIG. 15 (b), assume a case that a front side touch signal contiguously touching the front side in a specific direction 1520 using another hand is recognized while a mobile terminal is held by one hand. In this case, similar to FIG. 15 (a), the mobile terminal automatically stores a whole 1600 of the captured screen in a memory as shown in FIG. 16.

FIGS. 17(a), 17(b), 18(a) and 18(b) are diagrams for explaining a different example of capturing a whole screen captured by a mobile terminal according to one embodiment of the present invention. Unlike previous drawings, FIG. 17 and FIG. 18 show a process of capturing a partial specific area instead of a whole screen. In particular, FIG. 17 shows an embodiment of using one hand and FIG. 18 shows an embodiment of using both hands.

FIG. 17 (a) and FIG. 17 (b) may occur at the same time or in order. For instance, as shown in FIG. 17 (a), in a state that a user is touching a specific area 1710 of which the user wants to capture, the user touches (back tap) a specific area 1730 of a rear side of the mobile terminal one time as shown in FIG. 17 (b). In this case, the mobile terminal displays the corresponding area 1710 in a manner of highlighting the area. Subsequently, if the user touches (back tap) the specific area 1730 for the second time, the corresponding area 1710 is captured only and the corresponding area is moved to a clipboard 1720.

FIG. 18 (a) and FIG. 18 (b) may also occur at the same time or in order. For instance, as shown in FIG. 18 (b), when a specific area 1840 of a rear side is touched (back tap) one time, as shown in FIG. 18 (a), a square box 1830 capable of adjusting a capturing area is displayed. Subsequently, a user can adjust a size of the square box 1830 using another hand 1810/1820. Of course, a shape of the square box 1830 can be differently designed by those skilled in the art. And, in a state that the square box 1830 satisfying a user is decided, if a second touch (back tap) is recognized on the specific area 1840, the decided specific area 1830 is captured only and the specific area is moved to a clipboard.

Figures 19A, 19B:
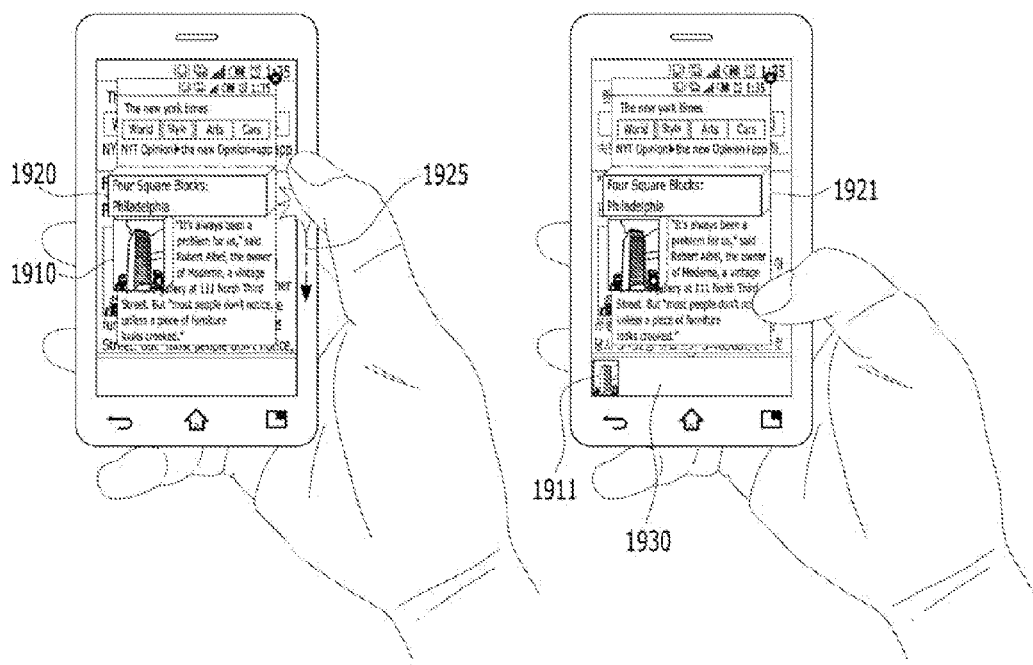
FIGS. 19(a) and 19(b) are diagrams for a process of storing a captured screen in a clipboard by a mobile terminal according to one embodiment of the present invention.

FIGS. 19(a) and 19(b) are diagrams for a process of storing a captured screen in a clipboard by a mobile terminal according to one embodiment of the present invention.

As mentioned in the foregoing description, assume that specific areas are captured only. As shown in FIG. 19 (a), the captured specific areas 1910/1920 are displayed as 3D graphic images. This can called a floating effect.

Subsequently, as shown in FIG. 19 (a), if a touch signal of a prescribed direction 1925 is recognized, as shown in FIG. 19 (b), the captured specific areas 1911/1921 also move to the specific direction. If the captured specific areas are contacted with a prescribed area, the captured specific areas are automatically stored in a clipboard. Of course, if a touch signal of a direction opposite to the direction mentioned earlier in FIG. 19 (a) is recognized, the captured areas stored in the clipboard 1930 are displayed again on a screen in an original size.

FIGS. 20(a), 20(b) and 20(c) are diagrams for a process of switching to a clipboard mode by a mobile terminal according to one embodiment of the present invention.

As shown in FIG. 20 (a), assume a state that a screen of a specific web page 2010 is captured. In this case, as shown in FIG. 20 (b), if a touch (back tap) is recognized on a specific area 2020 of a rear side of the mobile terminal, the captured screen is switched to a screen shown in FIG. 20 (c).

In particular, FIG. 20 (c) shows a case of switching to a clipboard mode 2030. The clipboard 2030 is designed to include the captured screen 2010 shown in FIG. 20 (a) as well.

FIGS. 21(a), 21(b), 21(c), 22, 23(a), 23(b), 23(c) and 23(d) are diagrams for a process of editing a captured screen by a mobile terminal according to one embodiment of the present invention. In particular, functions different from each other are executed according to whether a back tap is recognized on a specific area in a rear side of the mobile terminal.

As shown in FIG. 21 (a), assume that a random web page 2100 is captured (by one time back tap recognized on a middle area). In this case, as shown in FIG. 21 (b), assume that a second back tap signal is recognized on a right area 2110 among three areas of a rear side of the mobile terminal Subsequently, as shown in FIG. 21 (c), a screen of the mobile terminal is switched to a mode 2120 capable of editing a whole of the captured screen. Of course, differently designing an area on which the aforementioned back tap is touched and the number of the back tap also belongs to the scope of right of the present invention.

Figure 22:
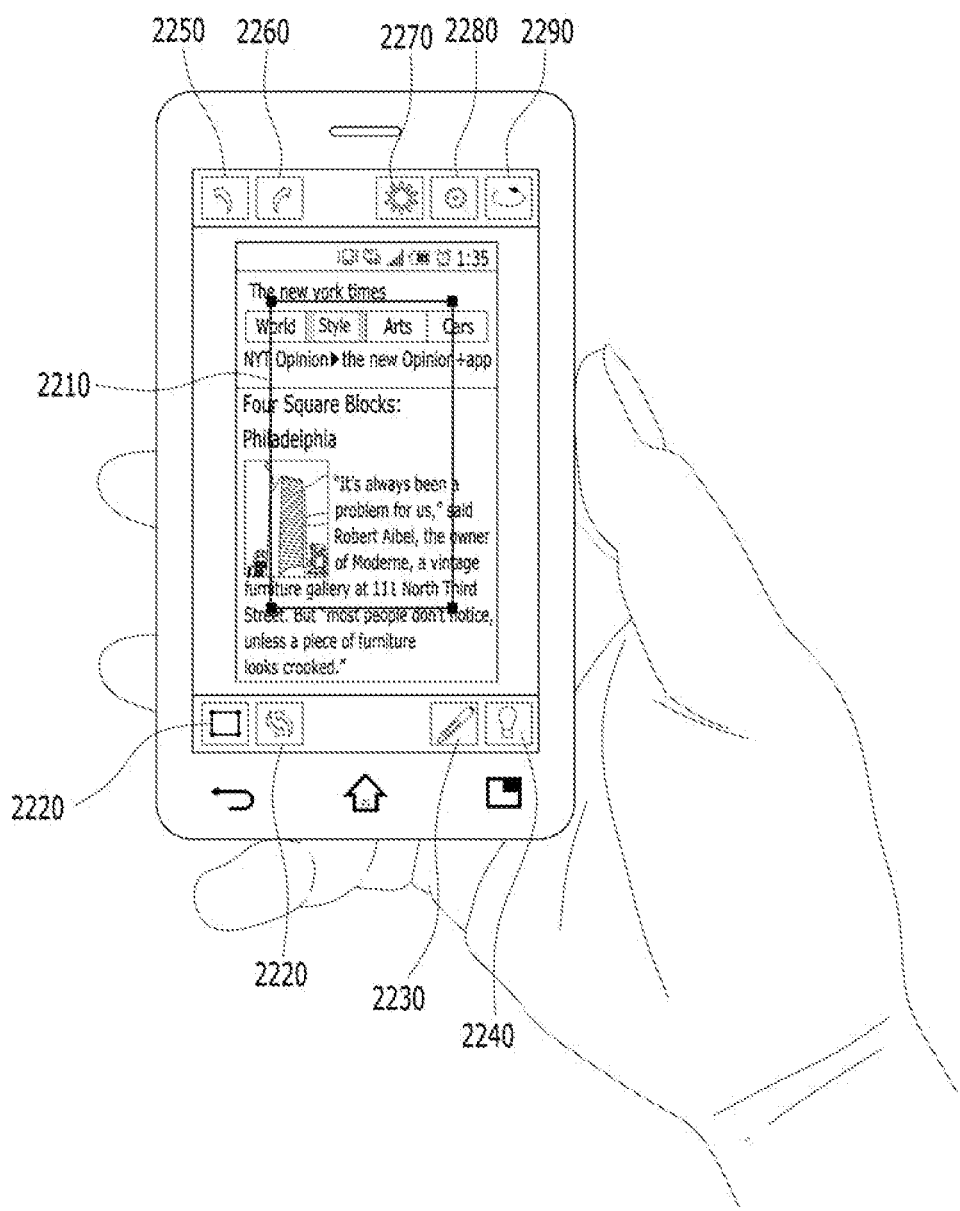
Figure 23A:
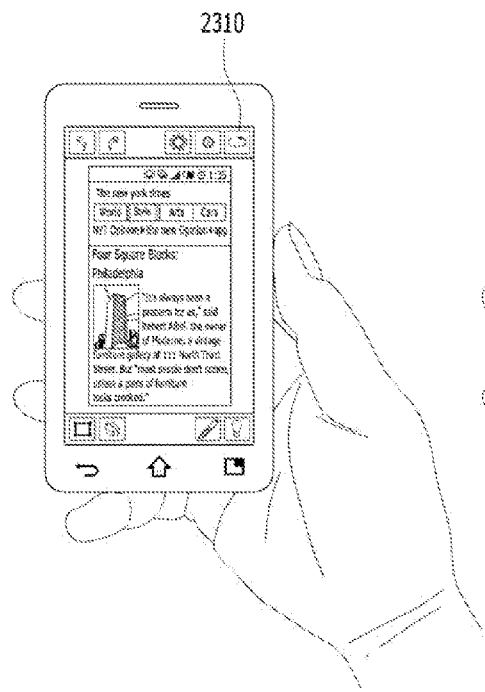
Figure 23B:
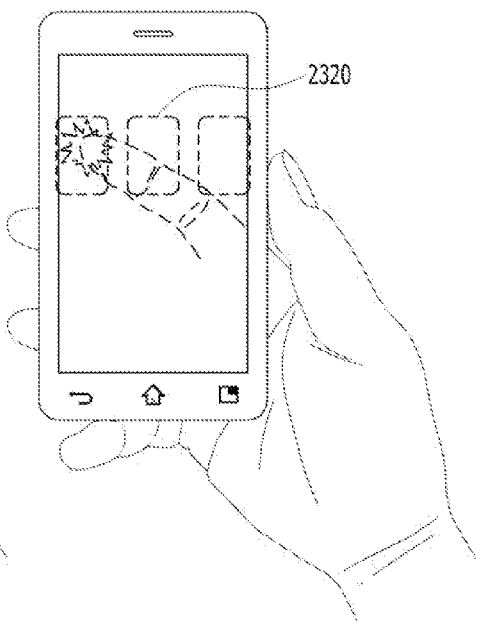
Figure 23C:
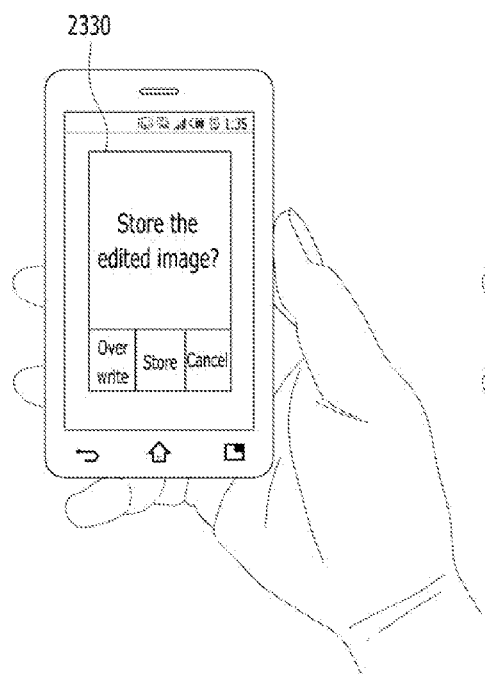
Figure 23D:
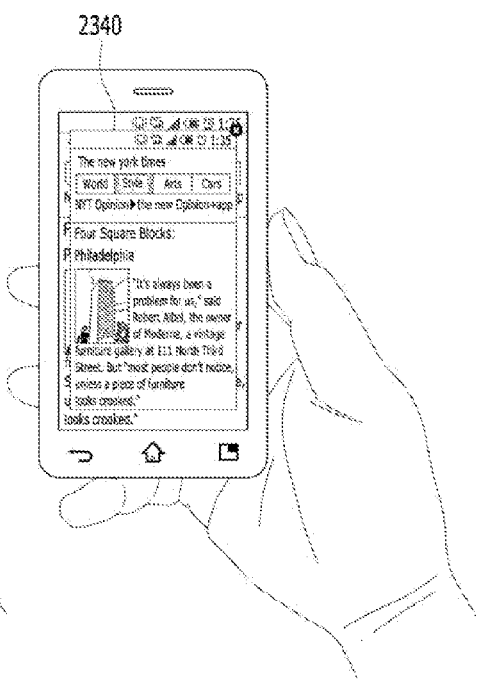
Figure 25A:
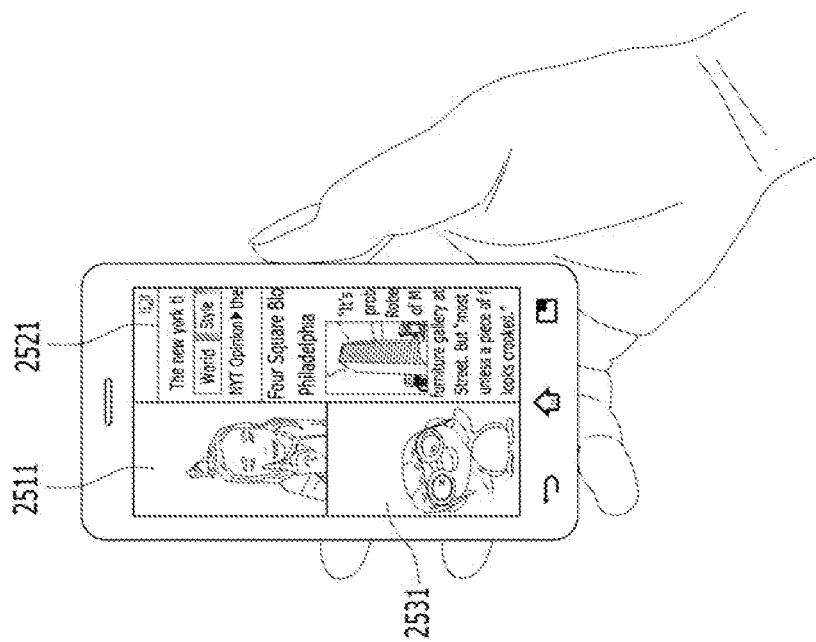
Figure 25B:
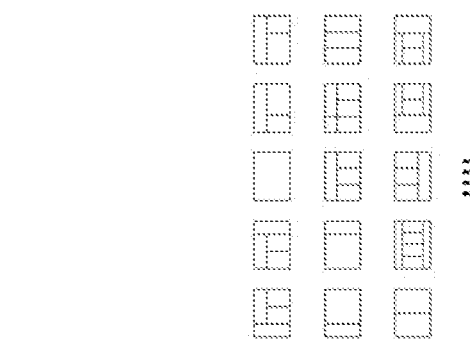
Figure 25C:
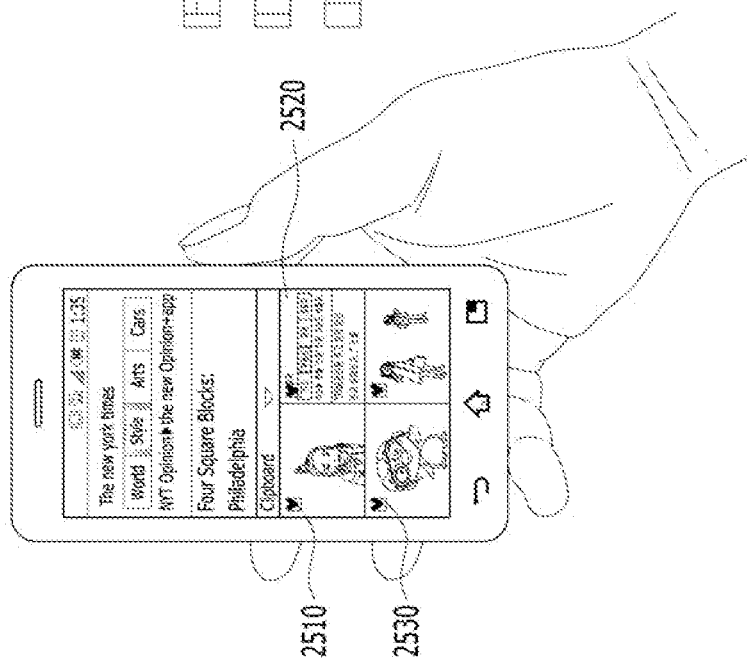
Figure 26A:
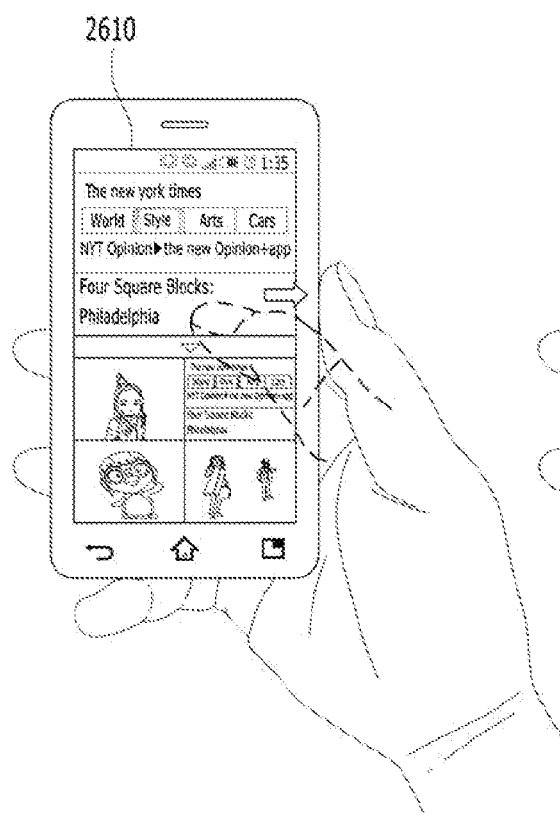
Figure 26B:
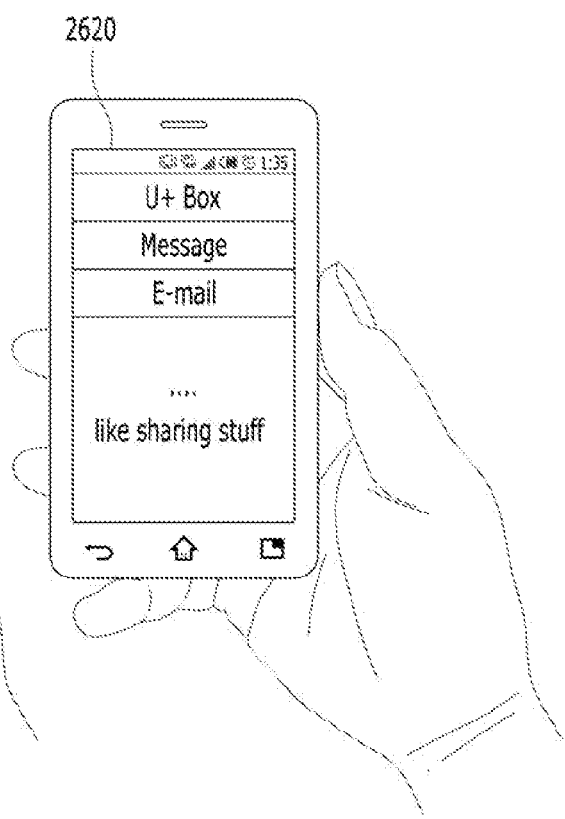
Figure 31A:
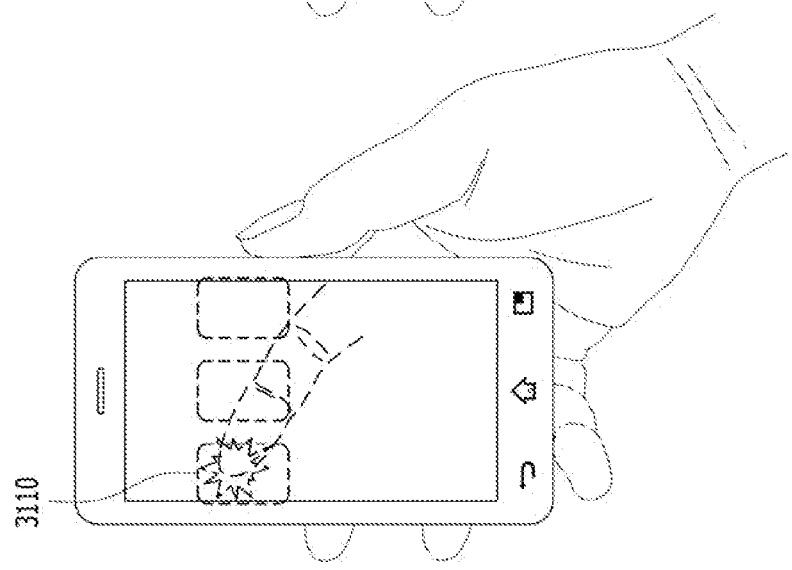
Figure 31B:
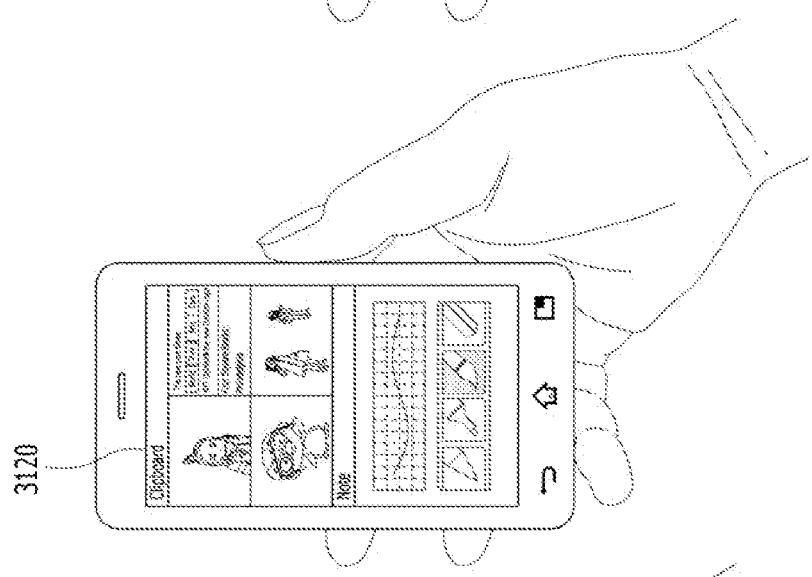
Figure 31C:
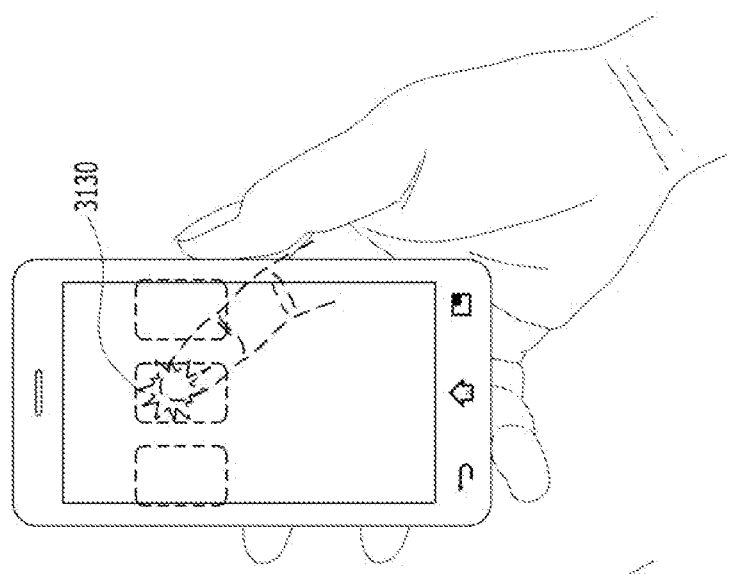
Figure 34C:
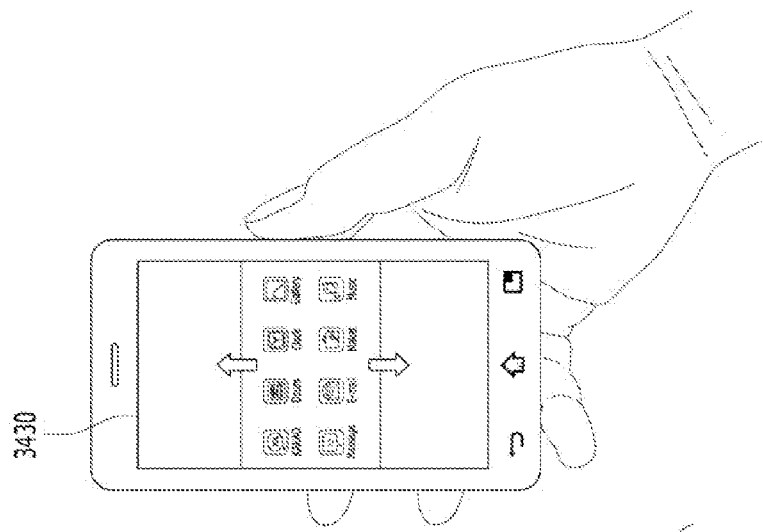
Figure 34B:
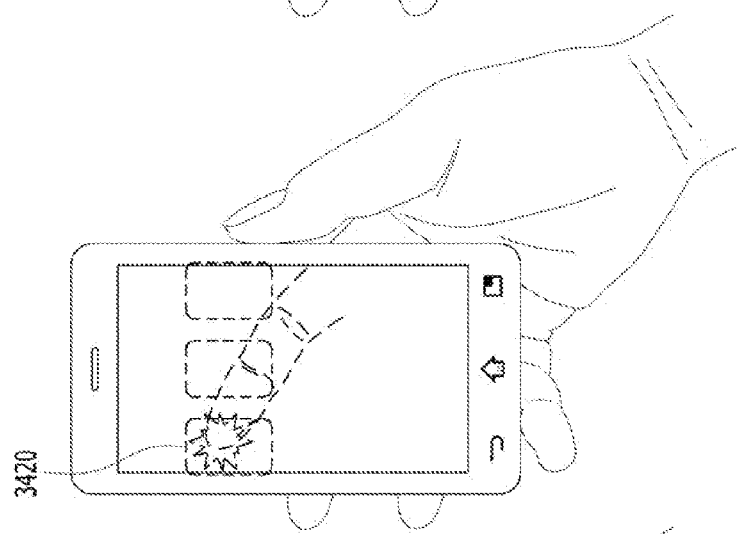
Figure 34A:
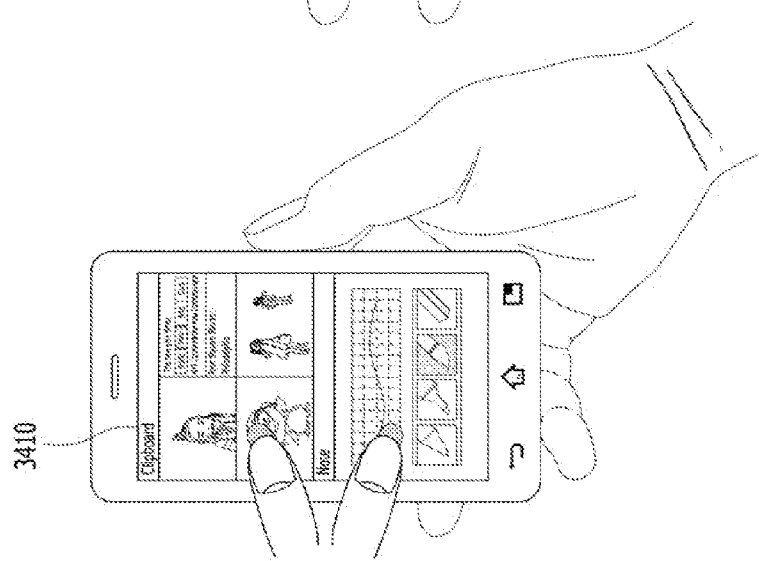
Figure 36A:
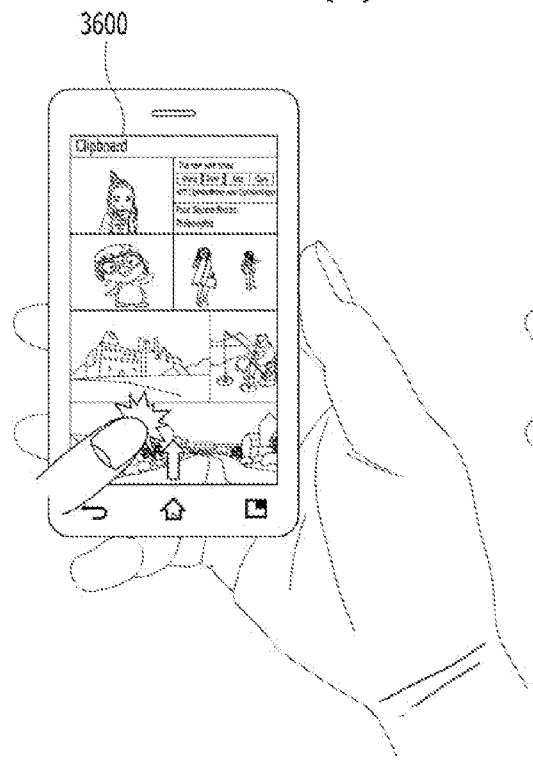
Figure 36B:
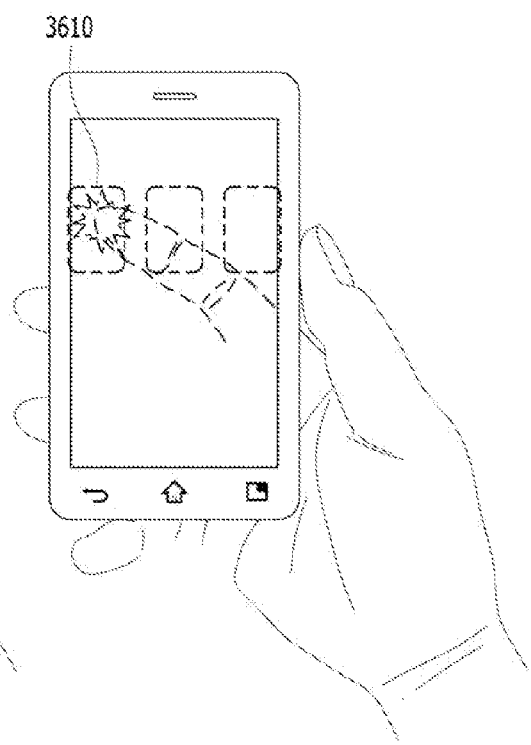
Figure 36C:
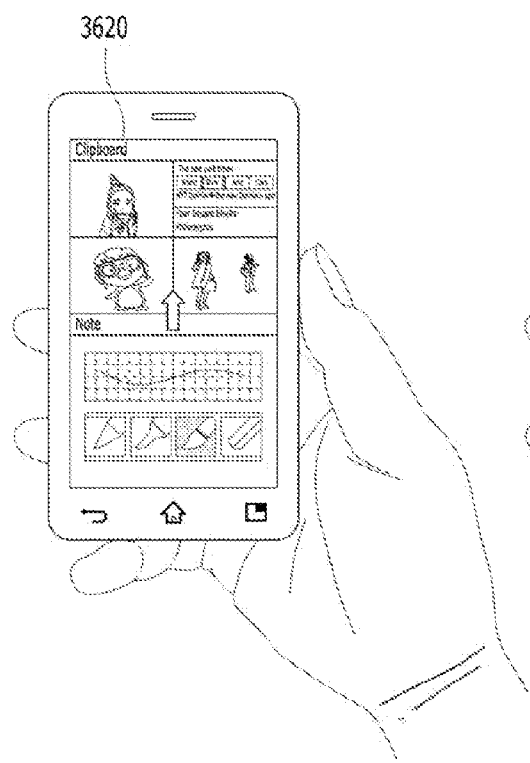
Figure 36D:
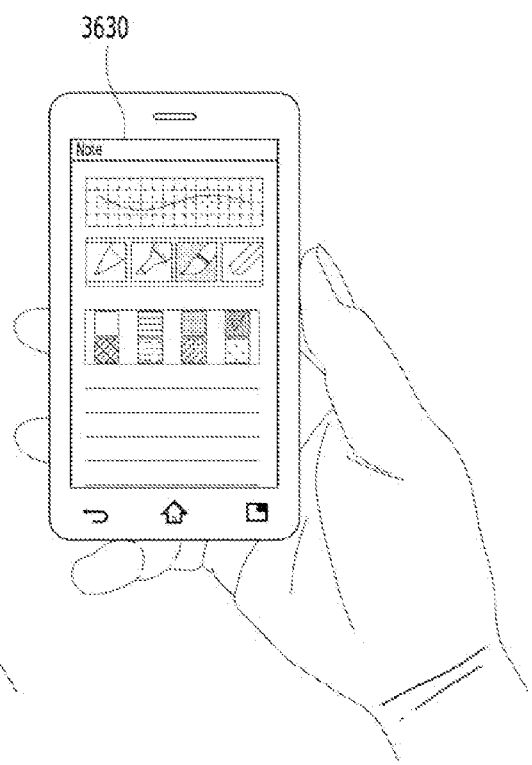

FIG. 22 shows the editing mode shown in FIG. 21 (c) in more detail. As depicted in FIG. 22, if a first option 2250 is selected, the mobile terminal may return to a previous screen. If a second option 2260 is selected, the mobile terminal may return to an original screen. If a third option 2270 is selected, the mobile terminal may execute an enlarging/reducing function. If a fourth option 2280 is selected, the mobile terminal may add an icon or a different image data. If a fifth option 2290 is selected, the mobile terminal may store an edited image data.

Meanwhile, if a sixth option 2210 is selected, an area of which a user wants to store can be reconfigured. If a seventh option 2220 is selected, the mobile terminal may rotate a screen. If an eighth option 2230 is selected, the mobile terminal may add a text. If a ninth option 2240 is selected, the mobile terminal may give effects such as change of light and shade and the like.

If a specific option 2310 is selected as shown in FIG. 23 (a) or a rear side back tap touch is recognized as shown in FIG. 23 (b), a message asking whether to store an edited image (captured screen) is displayed as shown in FIG. 23 (c). And, as shown in FIG. 23 (d), the edited captured screen is displayed again. Of course, a user can delete the edited image again by selecting a first option 2330 shown in FIG. 23 (d) and may return to a previous web page screen by selecting a second option 2340 shown in FIG. 23 (d).

FIGS. 24(a), 24(b), 24(c), 25(a), 25(b), 25(c), 26(a), 26(b), 27(a), and 27(b) are diagrams for a method of additionally utilizing a clipboard mode by a mobile terminal according to one embodiment of the present invention.

In FIG. 24 (a), assume that a web browser is executing. Or, assume a screen 2410 of which a random web page according to one embodiment of the present invention is captured. In this case, as shown in FIG. 24 (b), for instance, if a back tap is recognized twice on a specific area 2420 of a rear side of a mobile terminal, the mobile terminal is designed to display a clipboard 2430 as shown in FIG. 24 (c).

A user selects a random capture screen from a clipboard depicted in FIG. 25 (a). In FIG. 25 (a), assume that a first capture screen 2510, a second capture screen 2520 and a third capture screen 2530 are selected. One new image data can be generated by resizing the selected capture images.

For instance, as shown in FIG. 25 (b), a combination method according to the number of selected capture images is stored in a memory in advance. Of course, designing a position and a size of each of the capture images to be controllable by a user also belongs to the scope of right of the present invention.

As shown in FIG. 25 (c), the capture images selected in FIG. 25 (a) are displayed in one image. In particular, one image including a first capture screen 2511, a second capture screen 2521 and a third capture screen 2531 is stored in the memory.

As shown in FIG. 26 (a), a touch for a specific capture screen preferred by a user is recognized on a clipboard 2610. In particular, if the touch is slid to a random first direction (e.g., a right direction) in a state that the touch on the specific capture screen is maintained for more than a predetermined time, a screen of the mobile terminal is switched to a mode 2620 capable of sharing the selected capture screen as shown in FIG. 26 (b).

As shown in FIG. 27 (a), a touch on a specific capture screen preferred by a user is recognized on a clipboard. In particular, if the touch is slid to a random second direction (e.g., up direction) in a state that the touch on the specific capture screen is maintained for more than a predetermined time, as shown in FIG. 27 (b), the selected capture screen is deleted and pre-stored different capture screens 2720/2730 are displayed on the clipboard instead.

From now on, a different embodiment of the present invention is explained in the following. The different embodiment according to the present invention intends to implement multitasking according to a back tap recognized on a rear side of a mobile terminal and a touch signal recognized on a front side of the mobile terminal.

FIGS. 28(a), 28(b) and 28(c) are diagrams for an overall process of executing multitasking by a mobile terminal according to a different embodiment of the present invention.

As shown in FIG. 28 (a), a mobile terminal 2810 is executing a text service. In particular, assume that the mobile terminal has received a text message including a picture from a different device.

In this case, as shown in FIG. 28 (b), if a back tap is recognized on a specific area 2820 of a rear side of the mobile terminal and a front touch on the picture is recognized, as shown in FIG. 28 (c), the picture is displayed on a first area 2830 and a text service screen is displayed on a second area 2840, FIGS. 29(a), 29(b) and 29(c) are diagrams for a process of simultaneously executing a second application while a first application is executed by a mobile terminal according to a different embodiment of the present invention.

As shown in FIG. 29 (a), assume a case that a text message is received in the middle of executing a first application 2910. According to the related art, if the text message 2920 is touched, the text message is displayed only while a screen according to the first application 2910 is not displayed.

On the contrary, according to a different embodiment of the present invention, as shown in FIG. 29 (b), if a touch (back tap) on a specific area 2930 of a rear side as well as a front side touch on a text message area 2920 is recognized, a screen for a text message service is outputted in a first area 2940 and a previously executed first application is continuously outputted in a second area 2950 as shown in FIG. 29 (c).

FIGS. 30(a), 30(b) and 30(c) are diagrams for a process of switching to a mode executing a single application only while multitasking is executed by a mobile terminal according to a different embodiment of the present invention.

In FIG. 30 (a), assume that 2 types of applications are simultaneously executing according to FIG. 28 and FIG. 29 mentioned earlier in the foregoing description. In this case, as shown in FIG. 30 (b), if a back tap is recognized on a specific area 3020 of a rear side of a mobile terminal, as shown in FIG. 30 (c), one application 3030 is displayed only and execution of another application is stopped. Or, a corresponding screen of another application is not displayed.

FIGS. 31(a), 31(b), 31(c), 32(a), 32(b), 32(c), 33(a), 33(b), 33(c), 34(a), 34(b) and 34(c) are diagrams for a process of replacing an application of a specific area only while multitasking is executed by a mobile terminal according to a different embodiment of the present invention.

As shown in FIG. 31 (b), a mobile terminal 3120 is executing multitasking. In particular, the mobile terminal is executing A application and B application in a first area and a second area, respectively. In this case, in a state that a touch is recognized on the first area in which the A application is executing, as shown in FIG. 31 (a), if a back tap is recognized on a first area 3110 of a rear side, C application is executed instead of the A application of the first area of the front side. On the contrary, as shown in FIG. 31 (c), if a back tap is recognized on a second area 3130 of the rear side, D application is executed instead of the A application of the first area of the front side.

As shown in FIG. 32 (b), a mobile terminal 3220 is executing multitasking. In particular, the mobile terminal is executing A application and B application in a first area and a second area, respectively. In this case, in a state that a touch is recognized on the second area in which the B application is executing, as shown in FIG. 32 (a), if a back tap is recognized on a first area 3210 of a rear side, C application is executed instead of the B application of the second area of the front side. On the contrary, as shown in FIG. 32 (c), if a back tap is recognized on a second area 3230 of the rear side, D application is executed instead of the B application of the second area of the front side.

Yet, in FIG. 31 and FIG. 32, assume a case that at least two or more executable applications are stored in a memory in advance. Regarding a solution for a case that there is no pre-stored application, it shall be described with reference to FIG. 33 in the following.

As shown in FIG. 33 (b), a mobile terminal 3320 is executing multitasking. In particular, the mobile terminal is executing A application and B application in a first area and a second area, respectively. In this case, in a state that a touch is recognized on the first area in which the A application is executing, as shown in FIG. 33 (a), if a back tap is recognized on a first area 3310 of a rear side, or, as shown in FIG. 33 (c), if a back tap is recognized on a second area 3340 of the rear side, an application list 3330 is displayed instead of the A application of the first area of the front side.

Unlike FIG. 33, in FIG. 34, assume that all of two areas of a front side are selected instead of selecting one specific area. In particular, as shown in FIG. 34 (a), a mobile terminal 3410 is executing A application and B application in a first area and a second area, respectively. And, a touch signal is recognized on both the first area and the second area. And, as shown in FIG. 34 (b), if a back tap is recognized on a specific area 3420 of a rear side, as shown in FIG. 34 (c), an application list 3430 is displayed on both the first area and the second area.

FIGS. 35(a), 35(b), 35(c), 36(a), 36(b), 36(c) and 36(d) are diagrams for a process of more promptly switching a screen while multitasking is executed by a mobile terminal according to a different embodiment of the present invention.

As shown in FIG. 35 (a), a mobile terminal is displaying a multitasking screen 3510 and detects a front side touch on a first area in which A application is executing. The mobile terminal detects that the front side touch is moving to a down direction. And, as shown in FIG. 35 (b), if a back tap is recognized on a specific area 3520 of a rear side of the mobile terminal, as shown in FIG. 35 (c), multitasking is stopped and the A application is displayed on a whole area 3530. Hence, unlike the related art, there is a merit in that it is not necessary for a user to move the front side touch of the down direction to the bottom of a screen.

A screen 3600 shown in FIG. 36 (a) is depicted under an assumption of FIG. 35 (c). In this case, as shown in FIG. 36 (a), if a front side touch is performed from the bottom of a whole area in which A application is executing in up direction and, as shown in FIG. 36 (b), if a back tap is recognized one time on a specific area 3610 of a rear side of the mobile terminal, as shown in FIG. 36 (c), the A application is displayed on the first area and B application is displayed on the second area. Moreover, if a back tap is recognized again on the specific area 3610 of the rear side of the mobile terminal, as shown in FIG. 36 (d), the B application is displayed only on a whole screen 3630.

From now on, a further different embodiment of the present invention is explained in the following. According to the further different embodiment, zoom-in/zoom-out for a specific area is promptly performed according to a back tap recognized on a rear side of a mobile terminal and a touch signal recognized on a front side.

Figure 37:
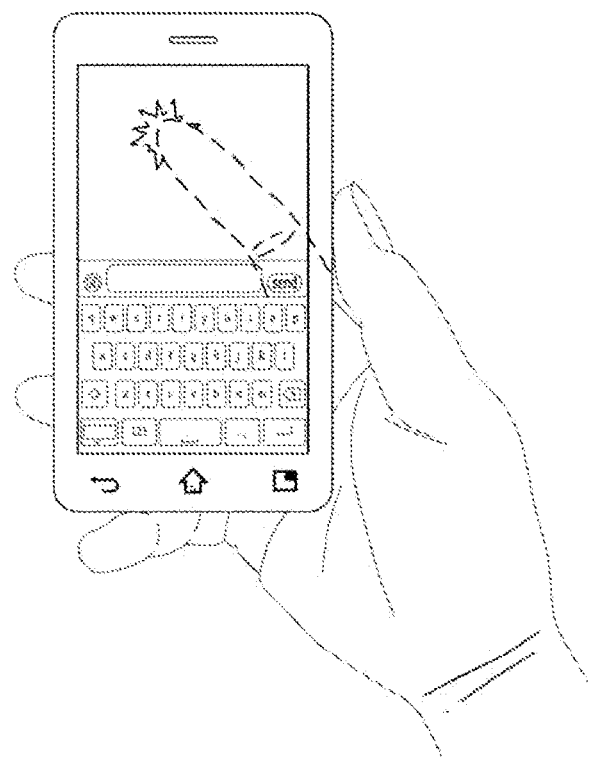
FIGS. 37 and 38 are schematic diagrams for a rear side touch (back tap) necessary for a mobile terminal to reduce or enlarge a specific area displayed on the mobile terminal according to a further different embodiment of the present invention.
Figure 38:
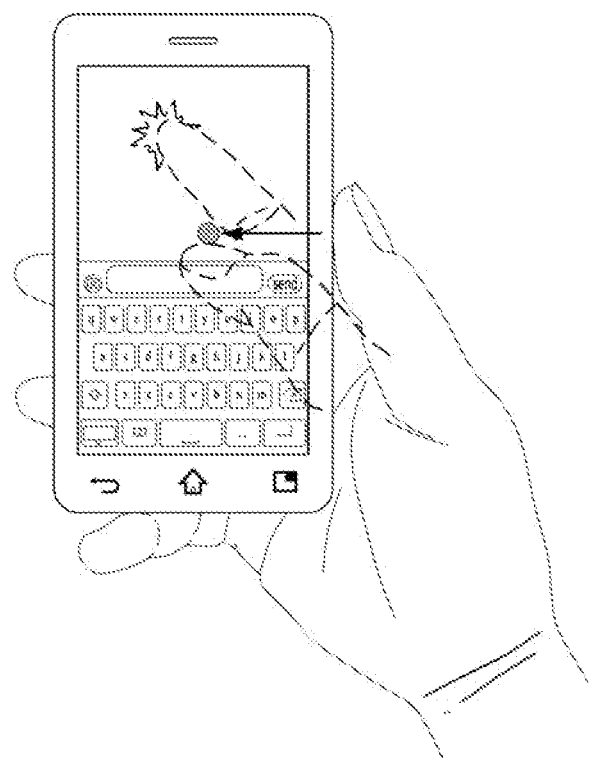
Figure 39A:
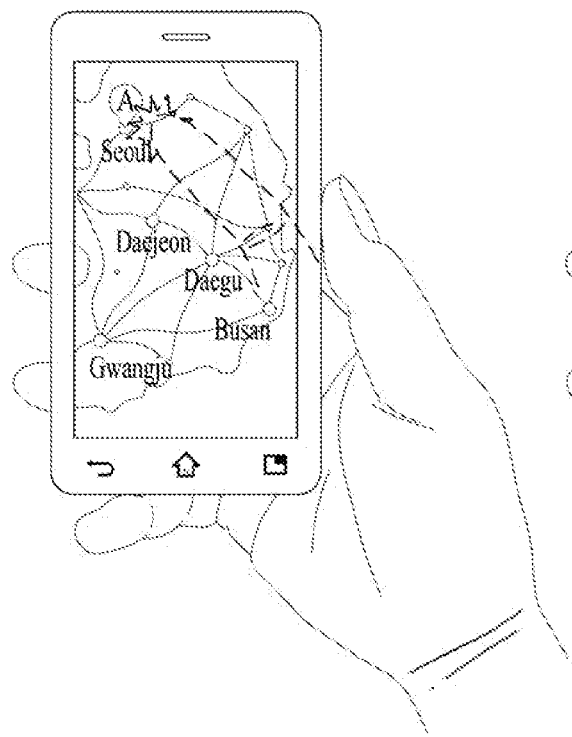
FIGS. 39(a), 39(b), 40(a) and 40(b) are diagrams for a process of reducing or enlarging a specific area by a mobile terminal according to a further different embodiment of the present invention based on FIGS. 37 and 38.
Figure 39B:
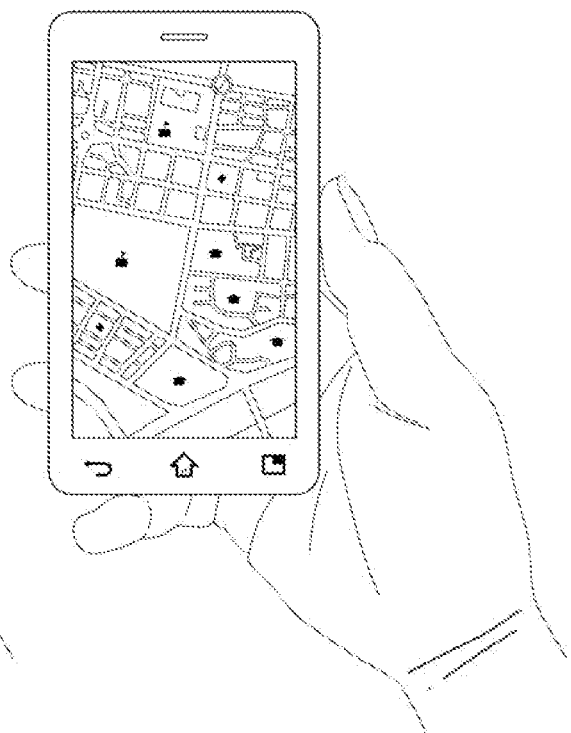
Figure 40A:
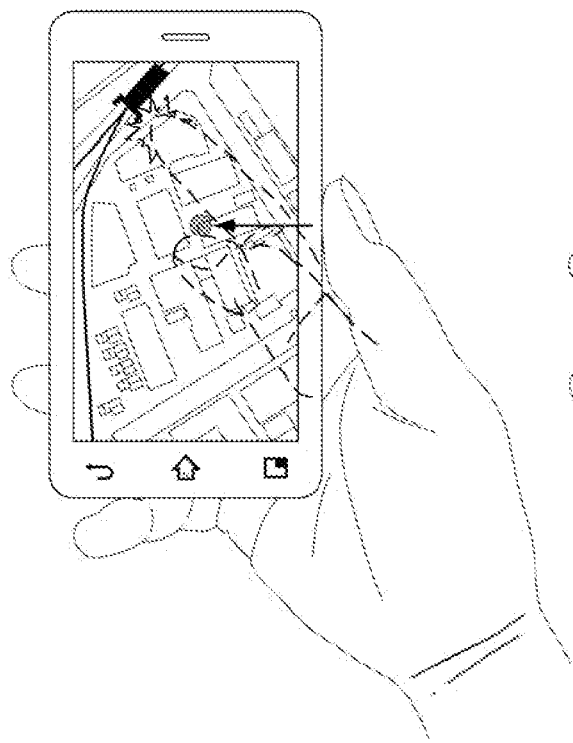
Figure 40B:
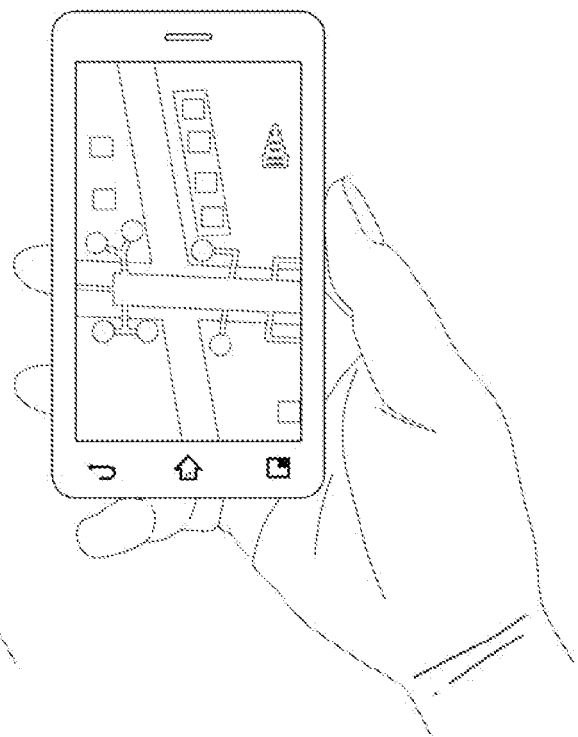
Figure 41A:
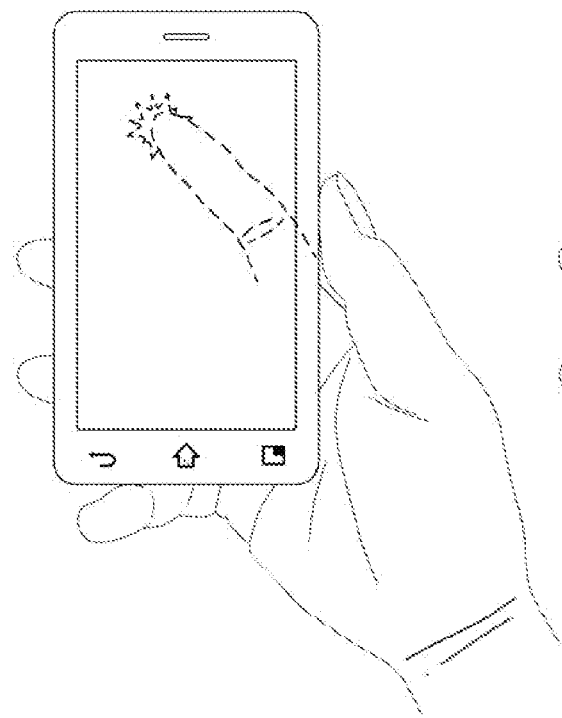
FIGS. 41(a), 41(b), 41(c), 41(d), 42(a), 42(b), 42(c) and 42(d) are diagrams for a function additionally provided after a specific area is reduced or enlarged by a mobile terminal according to a further different embodiment of the present invention based on FIGS. 37 and 38.
Figure 41B:
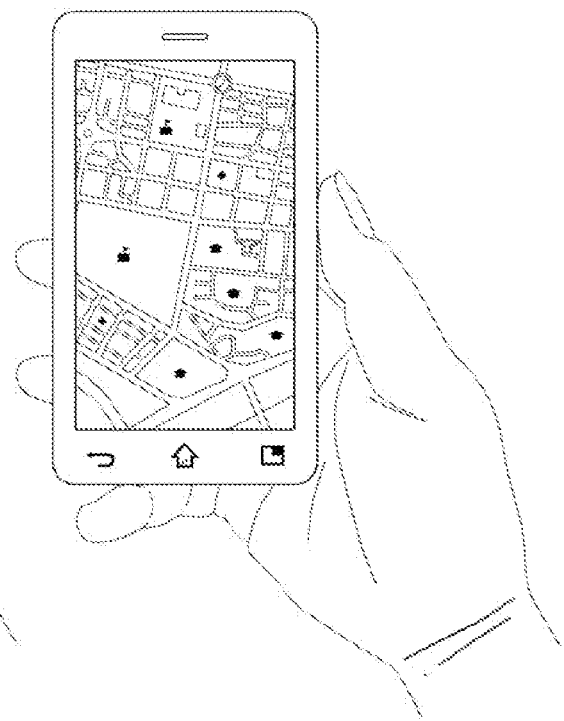
Figure 41C:
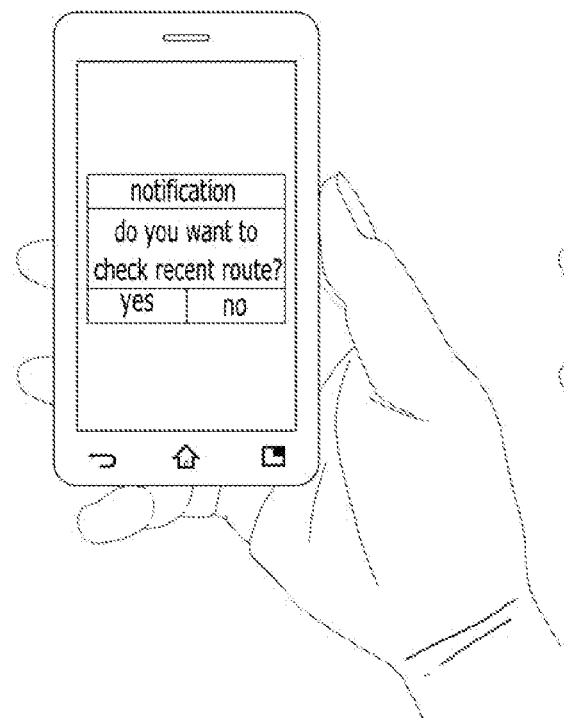
Figure 41D:
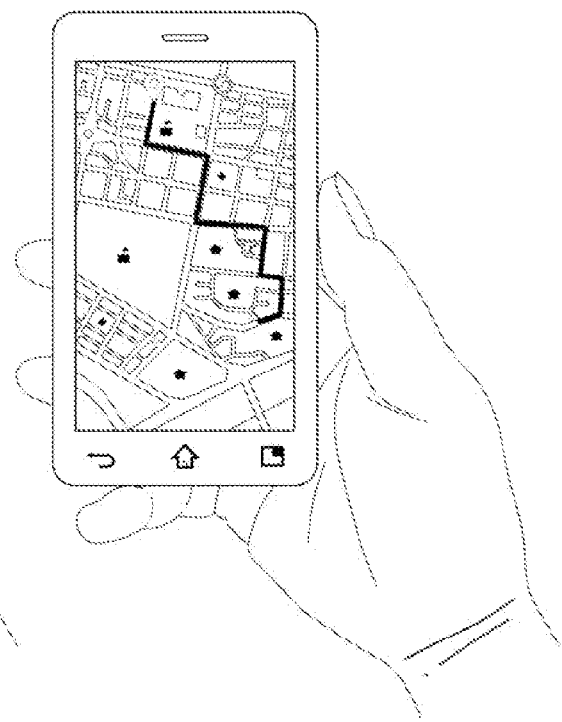
Figure 42A:
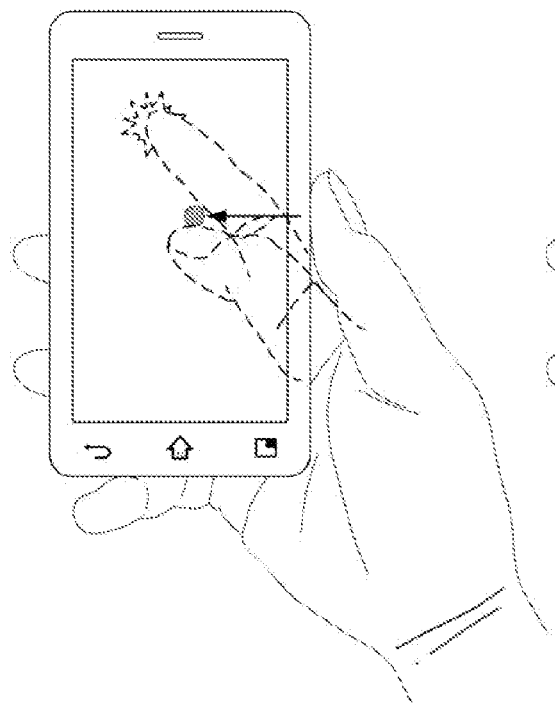
Figure 42B:
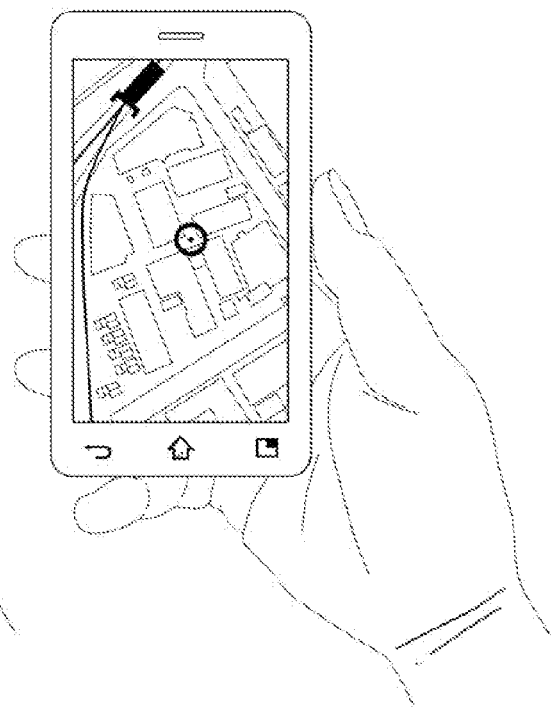
Figure 42C:
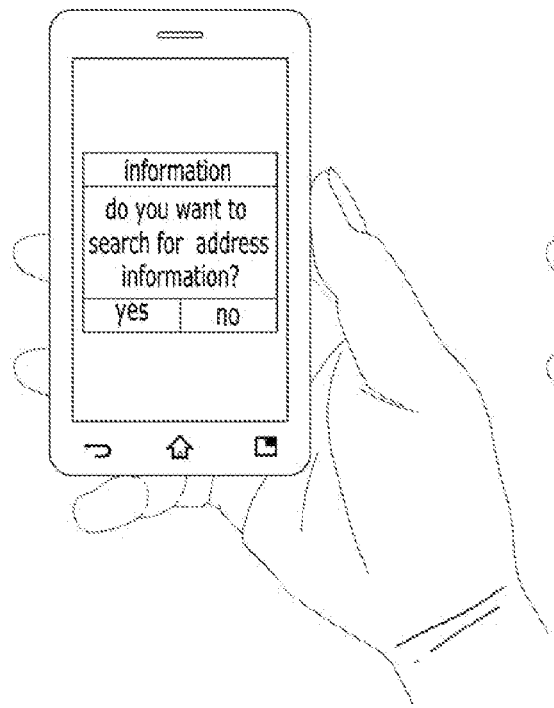
Figure 42D:
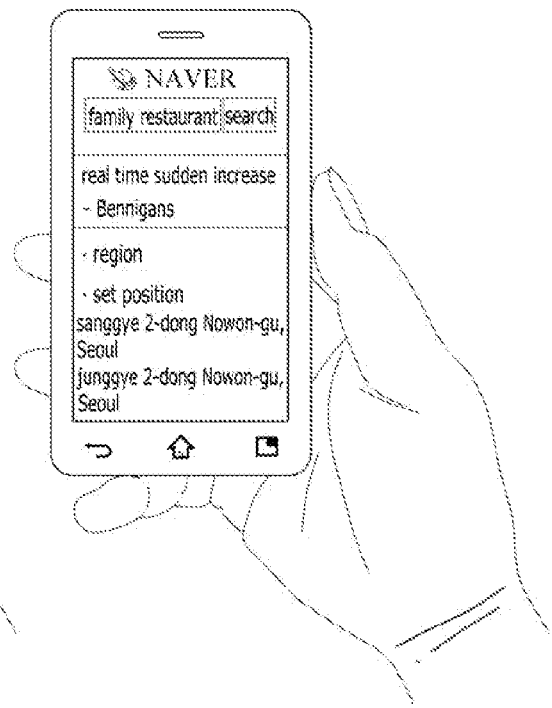
Figure 44A:
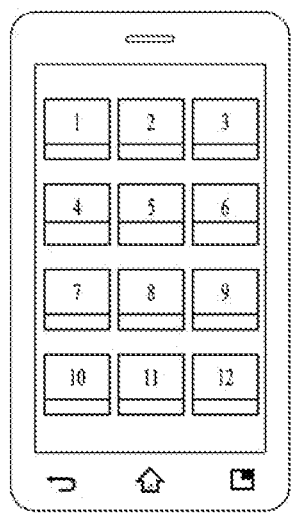
Figure 44B:
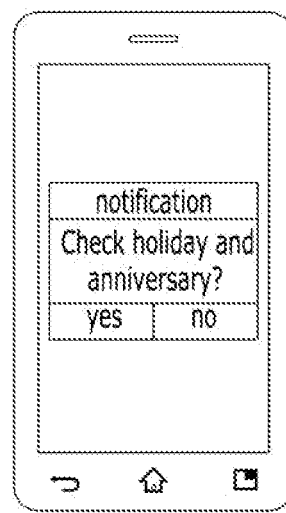
Figure 44C:
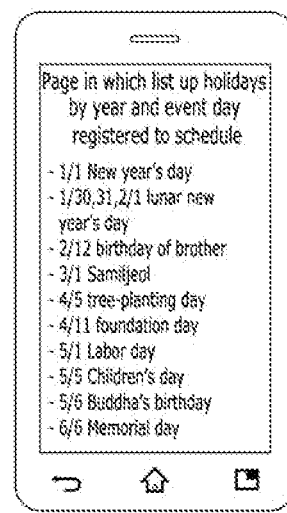
Figure 45A:
Figure 45B:
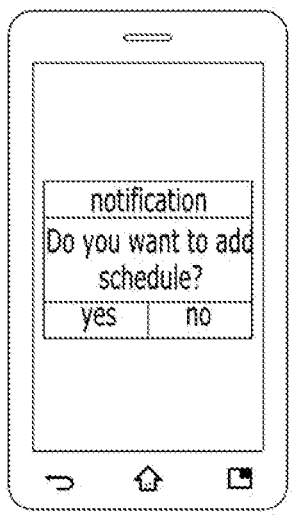
Figure 45C:
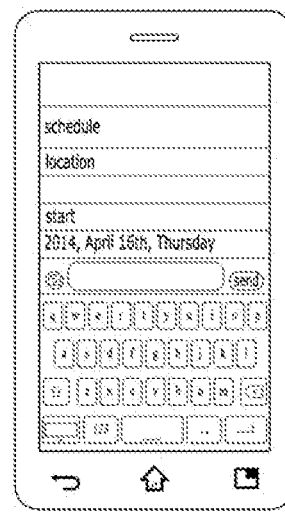
Figure 49A:
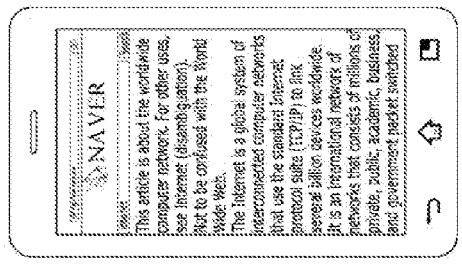
Figure 49B:
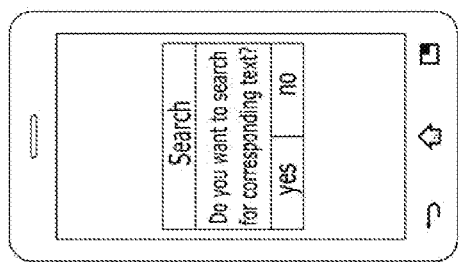
Figure 49C:
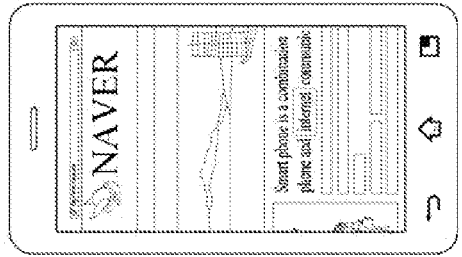
Figure 49D:
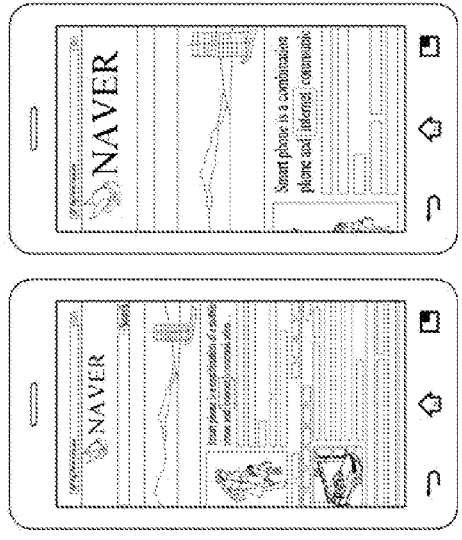
Figure 49E:
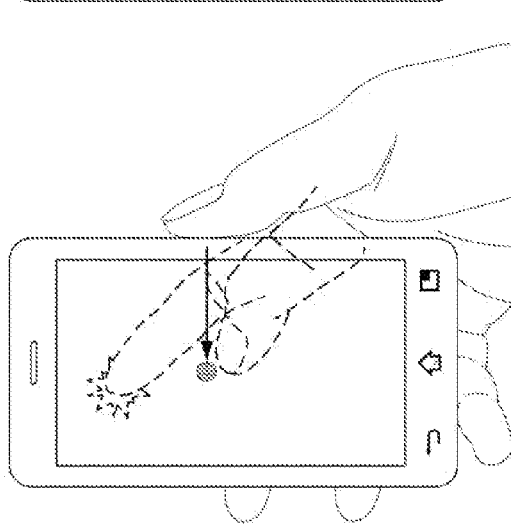
Figure 50A:
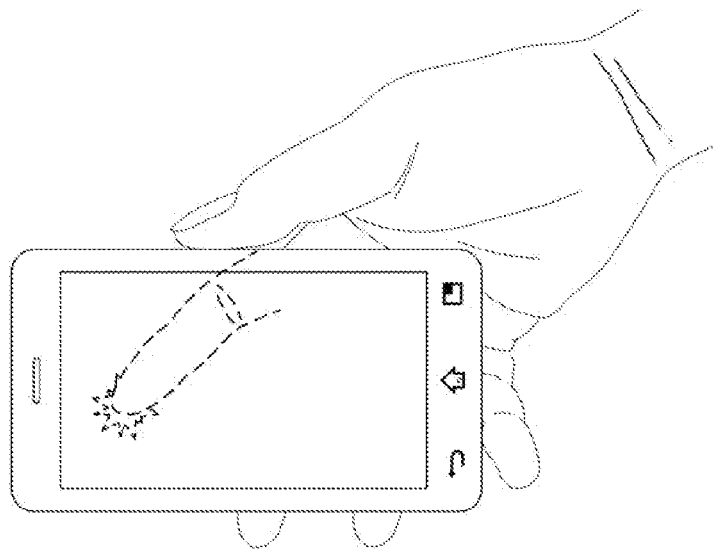
FIGS. 50(a), 50(b), 50(c), 50(d), 51(a), 51(b), 51(c) and 51(d) are detail diagrams for a gallery executed by a mobile terminal according to a further different embodiment of the present invention based on FIGS. 37 and 38.
Figure 50B:
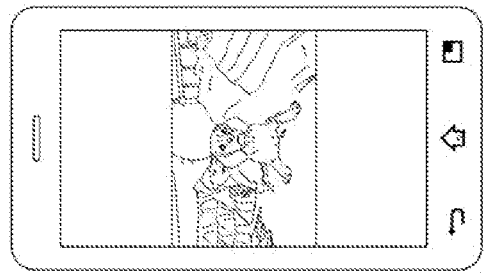
Figure 50C:
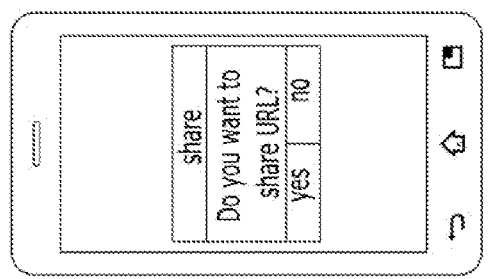
Figure 50D:
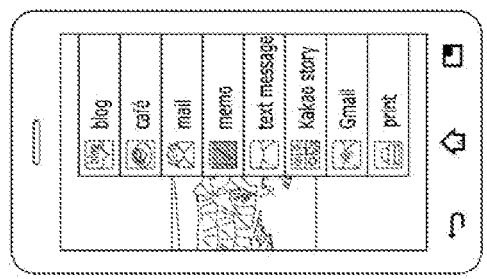
Figure 51D:
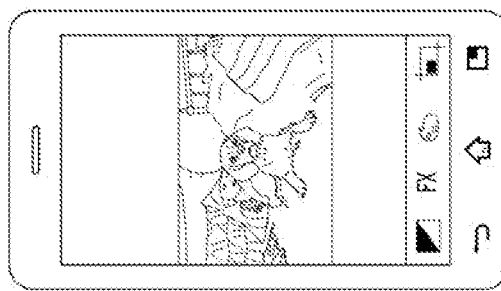
Figure 51C:
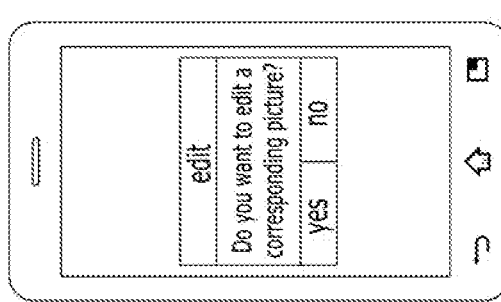
Figure 51B:
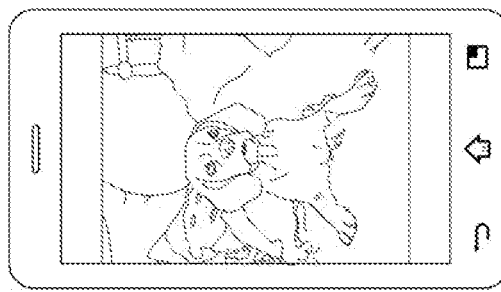
Figure 51A:
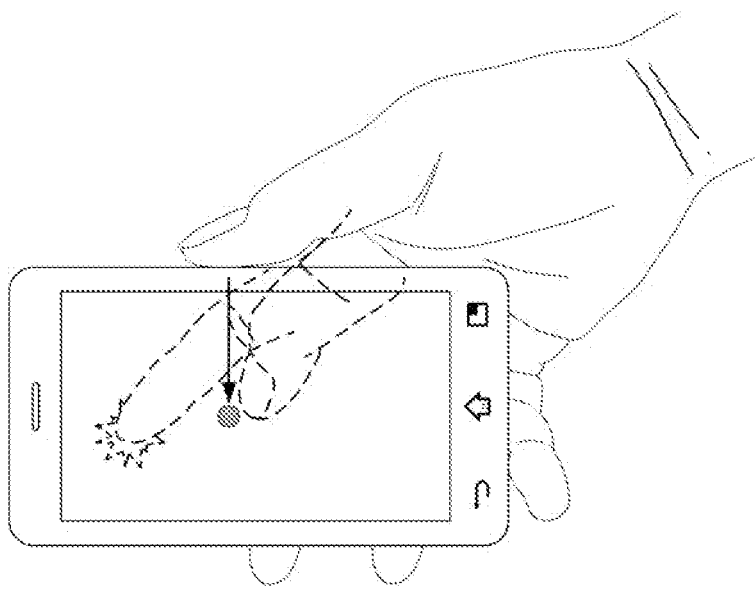

FIGS. 37 and 38 are schematic diagrams for a rear side touch (back tap) necessary for a mobile terminal to reduce or enlarge a specific area displayed on the mobile terminal according to a further different embodiment of the present invention. According to the related art, mostly, zoom-in/zoom-out for a specific area is performed using both hands. On the contrary, according to the further different embodiment of the present invention, the zoom-in/zoom-out can be implemented in a state that the mobile terminal is held by one hand.

As shown in FIG. 37, if a back tap is recognized by a sensor installed in a rear side of the mobile terminal according to the further different embodiment of the present invention, a currently displayed screen is zoomed out.

On the contrary, as shown in FIG. 37, if a back tap is recognized by the sensor installed in the rear side of the mobile terminal according to the further different embodiment of the present invention and a specific point is selected by a front side touch sensor, zoom-in is performed on the basis of the specific point. Of course, a front side touch and a back tap can be performed at the same time or can be performed on timing different from each other.

FIGS. 39(a), 39(b), 40(a) and 40(b) are diagrams for a process of reducing or enlarging a specific area by a mobile terminal according to a further different embodiment of the present invention based on FIGS. 37 and 38.

As shown in FIG. 39 (a), if a back tap is recognized on a specific area of a rear side of a mobile terminal, as shown in FIG. 39 (b), a screen is zoomed out. Moreover, if a back tap is recognized again, as shown in FIG. 39 (c), the screen is zoomed out again.

On the contrary, as shown in FIG. 40 (a), if a back tap is performed on a specific area of the rear side of the mobile terminal in a state that a specific point of a front side of the mobile terminal is touched, as shown in FIGS. 40 (b) and (c), the screen is changed to a maximum zoom-in state.

FIGS. 41(a), 41(b), 41(c), 41(d), 42(a), 42(b), 42(c) and 42(d) are diagrams for a function additionally provided after a specific area is reduced or enlarged by a mobile terminal according to a further different embodiment of the present invention based on FIGS. 37 and 38.

As shown in FIG. 41 (a), if a back tap is recognized on a specific area of a rear side of a mobile terminal, as shown in FIG. 41 (b), the mobile terminal displays a maximally zoomed out map. Moreover, if a back tap is recognized again, as shown in FIG. 41 (c), a message asking whether to check a recent route is outputted. If the message is selected, as shown in FIG. 41 (d), the recent route is displayed.

On the contrary, as shown in FIG. 42 (a), if a back tap is recognized on a specific area of a rear side in a state that a touch is performed on a specific point of a front side of the mobile terminal, as shown in FIG. 42 (b), the mobile terminal displays a maximally zoomed in map. Moreover, if a back tap is recognized again, as shown in FIG. 42 (c), a message asking whether to search for corresponding address information is outputted. If the message is selected, as shown in FIG. 42 (d), the corresponding address information is displayed.

FIGS. 43(a), 43(b), 43(c), 43(d), 43(e), 44(a), 44(b), 44(c), 45(a), 45(b) and 45(c) are detail diagrams for a calendar executed by a mobile terminal according to a further different embodiment of the present invention based on FIGS. 37 and 38. According to a calendar function of a related art, a monthly schedule is changed to a weekly/daily schedule in a manner of long touching a bottom bar of the monthly schedule and dragging the bottom bar to the top. It was inconvenient and takes a long time. Moreover, there was a problem of using both hands as well.

On the contrary, as shown in FIG. 43 (a), if a back tap is recognized on a specific area of a rear side of a mobile terminal in a state that March 4310 displayed on a front side of the mobile terminal is touched, as shown in FIG. 43 (b), a screen of the mobile terminal is changed to a detail schedule of March.

Moreover, if a back tap is recognized again in a state that a specific week 4320 depicted in FIG. 43 (b) is touched, as shown in FIG. 43 (c), a detail schedule of the specific week is displayed.

And, if a back tap is recognized again in a state that a specific date ($25^{th}$) is touched on the week depicted in FIG. 43 (c), as shown in FIG. 43 (d), a detail schedule of the specific date ($25^{th}$) is displayed. And, if a back tap is recognized again, as shown in FIG. 43 (e), a schedule of time unit is displayed in detail.

In summary, if a back tap is recognized only, zoom-out is performed. On the other hand, if both a back tap signal and a front side touch are recognized, zoom-in is performed on the basis of a point (or data) on which the front side touch is performed.

FIG. 44 (a) corresponds to FIG. 43 (a). If a back tap signal for performing zoom-out is recognized only in a state that FIG. 44 (a) is displayed, a message asking whether to check an anniversary and the like of a corresponding year is displayed (FIG. 44 (b)). If the message is selected, as shown in FIG. 44 (c), a list including anniversary of the corresponding year is outputted.

On the contrary, FIG. 45 (a) corresponds to FIG. 43 (e). If a back tap is recognized after a front side touch is performed on a specific date shown in FIG. 45 (a), a message asking whether to add a schedule is outputted as shown in FIG. 45 (b). If the message is selected, as shown in FIG. 45 (c), options capable of adding a schedule are displayed.

Hence, according to FIG. 44 and FIG. 45, an additional relevant function can be provided even after the zoom-in/zoom-out mentioned earlier in FIG. 43. According to the related art, when the zoon-in/zoom-out is terminated by a touch of an identical type, the zoon-in/zoom-out cannot be performed anymore. Moreover, additional functions are not provided.

FIGS. 46(a), 46(b), 46(c), 47(a), 47(b), 47(c), 48(a), 48(b), 48(c), 48(d), 49(a), 49(b), 49(c), 49(d) and 49(e) are detail diagrams for a web browser executed by a mobile terminal according to a further different embodiment of the present invention based on FIGS. 37 and 38. According to the related art, zoom-in is performed by a first front side touch and zoom-out is performed by a second front side touch. In particular, according to the related art, a step by step zoom-in/zoom-out is not provided.

As shown in FIG. 46 (a), assume that a back tap is recognized on a specific area of a rear side of a mobile terminal. In this case, a web page screen shown in FIG. 46 (b) is zoomed out to a web page screen shown in FIG. 46 (c).

On the contrary, as shown in FIG. 47 (a), assume that a touch signal is applied to a specific point of a front side of a mobile terminal and a back tap is recognized on a specific area of a rear side of the mobile terminal. In this case, a web page screen shown in FIG. 47 (b) is zoomed in on the basis of the point on which the front side touch is touched in FIG. 47 (a). Consequently, the web page screen is switched to a screen shown in FIG. 47 (c). In FIG. 47, although one step zoom-in is explained as an example, the zoom-in can be performed in many steps according to the number of back taps.

Again, according to the related art, no matter what type of touch input is inputted, if zoom-in or zoom-out is performed until the last step, no more function is provided.

Yet, according to a further different embodiment of the present invention described in FIG. 48 and FIG. 49 in the following, if a back tap signal is recognized again after a maximum zoom-out, an option capable of capturing a corresponding web page or sharing a URL (uniform resource locator) of the corresponding web page is provided. On the contrary, if a back tap signal is recognized again after a maximum zoom-in, the mobile terminal determines whether there exists a text in a maximum zoom-in area. If a text is recognized, the mobile terminal displays a web page screen searched by the recognized text. Yet, if a text is not recognized, the mobile terminal stores a whole of the zoom-in area or a part of the zoom-in area in a memory. Regarding this, it shall be explained again with reference to FIG. 18 and FIG. 49 in the following.

As shown in FIG. 48 (a), if a back tap is recognized on a rear side of a mobile terminal, zoom-out is performed. For instance, a zoom-out screen shown in FIG. 48 (b) corresponds to a maximally enlarged screen. In this case, if a back tap is recognized again, since the screen is unable to be enlarged anymore, as shown in FIG. 48 (c), a message asking whether to capture the current enlarged screen is displayed. Or, as shown in FIG. 48 (d), a message asking whether to share a URL of a current web page with different persons via SNS is displayed. FIGS. 48 (c) and (d) can be performed at the same time or a user may select one of them.

On the contrary, as shown in FIG. 49 (a), if a back tap is recognized on a specific area of a rear side in a state that a specific point of a front side of a mobile terminal is touched, zoom-in is performed. For instance, the zoom-in is continuously performed according to the number of back taps and a screen of FIG. 49 (b) is switched to a screen of FIG. 49 (c). In particular, the screen of FIG. 49 (c) corresponds to a screen in which maximum zoom-in is performed. In this case, if a back tap is recognized again, since the screen is unable to be reduced anymore, as shown in FIG. 49 (d), a message asking whether to search for a corresponding text is displayed. As shown in FIG. 49 (c), assume that the mobile terminal has recognized a specific text (LA Dodgers). Lastly, as shown in FIG. 49 (e), the mobile terminal displays additional information result searched by the corresponding text. In particular, FIG. 49 (e) means a result searched by the corresponding text in a predetermined web page (home page).

FIGS. 50(a), 50(b), 50(c), 50(d), 51(a), 51(b), 51(c) and 51(d) are detail diagrams for a gallery executed by a mobile terminal according to a further different embodiment of the present invention based on FIGS. 37 and 38. In particular, FIGS. 50(a) to 51(d) assume a case that a gallery is executing. For instance, the gallery may correspond to a menu displaying images and video data stored in a memory of the mobile terminal.

As shown in FIG. 50 (a), if a back tap is recognized on a rear side of a mobile terminal, zoom-out is performed. FIG. 50 (b) shows a random image data (a picture and the like) in which maximum zoom-in is performed. In this case, as shown in FIG. 50 (a), if a back tap is recognized again, as shown in FIG. 50 (c), a message asking whether to share the image data is displayed. And, if the message is selected, as shown in FIG. 50 (d), at least one or more options capable of sharing the image data are displayed.

On the contrary, as shown in FIG. 51 (a), if a back tap is recognized on a specific area of a rear side in a state that a specific point of a front side of a mobile terminal is touched, zoom-in is performed. FIG. 51 (b) shows an image data in which maximum zoom-in is performed. In this case, if a back tap is recognized again, since the zoom-in is unable to be performed anymore, as shown in FIG. 51 (c), a message asking whether to edit the image data is displayed. And, if the message is selected, as shown in FIG. 51 (d), the mobile terminal is switched to an editing mode.

According to the aforementioned 3 embodiments of the present invention, it is able to check a tap on a specific position of a rear side in a manner of utilizing a legacy acceleration sensor without a separate touch panel of the rear side of the mobile terminal.

Moreover, differentiated UX/UI can be provided using a back tap instead of UX, which was difficult to utilize by a front side touch screen only. And, a user may promptly switch a mode using one hand only even in a multitasking situation.

Although the present specification explains one embodiment, a different embodiment and a further different embodiment in a manner of distinguishing the embodiments from each other, those who skilled in the art can combine the embodiments with each other or may implement the embodiments in a manner of partially modifying the embodiments. In principle, the scope of right should be decided according to items written on the claims.

The present invention mentioned in the foregoing description can be implemented by codes readable by a computer in media in which a program is recorded. Media readable by a computer includes all kinds of recording devices in which data readable by a computer system is stored. Examples of the media readable by a computer include a HDD (hard disk drive), an SSD (solid state disk), an SDD (silicon disk drive), a ROM, a RAM, a CD-ROM, a magnetic tape, a floppy disk, an optical data storing device and the like. And, the media can be implemented in a form of a carrier wave (e.g., transmission via the internet). And, the computer may include a controller 180 of a terminal. While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A method of controlling a mobile terminal, the method comprising:
    displaying a screen on a display, the displayed screen comprising at least text data, image data, or video data;
    capturing the displayed screen in response to a first touch input applied to a first user interface module;
    selecting a partial area of the displayed captured screen in response to a second touch input applied to a second user interface module;
    storing the selected partial area in a memory;
    performing a first function in response to a third input applied to the first user interface module, the third touch input comprising a first number of touches; and
    performing a second function in response to a fourth touch input applied to the first user interface module, the fourth touch input comprising a second number of touches that is different from the first number,
    wherein:
    the first function is different from the second function;
    the first user interface module is located on a first side of the mobile terminal; and
    the second user interface module is located on a second side of the mobile terminal on which the display is located.

2. The method of claim 1, further comprising displaying a selection box for selecting the partial area in response to a fifth touch input applied to the first user interface module.

3. The method of claim 2, wherein:
    the second touch input comprises manipulating the selection box; and
    the selected partial area is stored in response to a sixth touch input applied to the first user interface module.

4. The method of claim 3, wherein the fifth touch input and the sixth touch input are applied to a same defined location of the first user interface module.

5. The method of claim 1, wherein the first user interface module comprises at least two defined areas such that each of the at least two defined areas is distinguishable from at least one other area, and a different function is performed based on which one of the at least two defined areas is touched when a touch input is applied to the first user interface module.

6. The method of claim 5, further comprising displaying at least one option for transmitting a graphic image corresponding to the stored partial area to an external device in response to a fifth touch input applied to a first area of the at least two defined areas.

7. The method of claim 6, further comprising displaying at least one option for editing the graphic image in response to a sixth touch input applied to a second area of the at least two defined areas.

8. The method of claim 1, further comprising displaying at least one option for transmitting a graphic image corresponding to the stored partial area to an external device in response to a fifth touch input applied to the second user interface module in a first direction.

9. The method of claim 8, further comprising displaying at least one option for editing the graphic image in response to a sixth touch input applied to the second user interface module in a second direction.

10. A mobile terminal, comprising:
    a memory configured to store at least one command;
    a display configured to display a screen comprising at least text data, image data, or video data;
    a first user interface module located on a first side of the mobile terminal and configured to receive a touch input;
    a second user interface module located on a second side of the mobile terminal and configured to receive a touch input; and
    a controller configured to:
        perform a first function in response to a first touch input applied to the first user interface module;
        perform a second function in response to a second touch input applied to the second user interface module;
        perform a third function in response to a third touch input applied to the first user interface module, the third touch input comprising a first number of touches; and
        perform a fourth function in response to a fourth touch input applied to the first user interface module, the fourth touch input comprising a second number of touches that is different from the first number, further the third function is different from the second function.

11. The mobile terminal of claim 10, wherein:
    the first function is capturing the displayed screen;
    the second function is selecting a partial area of the captured screen; and
    the controller is further configured to cause the memory to store the selected partial area.

12. The mobile terminal of claim 11, wherein the controller is further configured to cause the display to display a selection box for selecting the partial area in response to a fifth touch input applied to the first user interface module.

13. The mobile terminal of claim 12, wherein the second touch input comprises manipulating the selection box, and the selected partial area is stored in response to a sixth touch input applied to the first user interface module.

14. The mobile terminal of claim 13, wherein the fifth touch input and the sixth touch input are applied to a same defined location of the first user interface module.

15. The mobile terminal of claim 11, wherein the first user interface module comprises at least two defined areas such that each of the at least two defined areas is distinguishable from at least one other area, and a different function is performed based on which one of the at least two defined areas is touched when a touch input is applied to the first user interface module.

16. The mobile terminal of claim 15, wherein the controller is further configured to cause the display to display at least one option for transmitting a graphic image corresponding to the stored partial area to an external device in response to a fifth touch input applied to a first area of the at least two defined areas.

17. The mobile terminal of claim 16, wherein the controller is further configured to cause the display to display at least one option for editing the graphic image in response to a sixth touch input applied to a second area of the at least two defined areas.

18. The mobile terminal of claim 11, wherein the controller is further configured to cause the display to display at least one option for transmitting a graphic image corresponding to the stored partial area to an external device in response to a fifth touch input applied to the second user interface module in a first direction.

19. The mobile terminal of claim 18, wherein the controller is further configured to cause the display to display at least one option for editing the graphic image in response to a sixth touch input applied to the second user interface module in a second direction.

20. The mobile terminal of claim 10, wherein the controller is further configured to perform a specific function corresponding to a specific combination of a fifth touch input applied to the first user interface module and a sixth touch input applied to the second user interface module.

* * * * *